United States Patent
Khorrami et al.

(10) Patent No.: US 12,450,353 B2
(45) Date of Patent: *Oct. 21, 2025

(54) ANOMALY DETECTION IN REAL-TIME MULTI-THREADED PROCESSES ON EMBEDDED SYSTEMS AND DEVICES USING HARDWARE PERFORMANCE COUNTERS AND/OR STACK TRACES

(71) Applicant: NEW YORK UNIVERSITY, New York, NY (US)

(72) Inventors: Farshad Khorrami, Brooklyn, NY (US); Ramesh Karri, New York, NY (US); Prashanth Krishnamurthy, Forest Hills, NY (US)

(73) Assignee: New York University, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,080

(22) Filed: Jul. 21, 2023

(65) Prior Publication Data

US 2024/0045966 A1   Feb. 8, 2024

Related U.S. Application Data

(63) Continuation of application No. 16/403,464, filed on May 3, 2019, now Pat. No. 11,709,939.

(Continued)

(51) Int. Cl.
*G06F 11/36* (2006.01)
*G06F 11/00* (2006.01)
(Continued)

(52) U.S. Cl.
CPC ............ *G06F 21/57* (2013.01); *G06F 11/006* (2013.01); *G06F 11/0721* (2013.01);
(Continued)

(58) Field of Classification Search
CPC .... G06F 21/57; G06F 11/006; G06F 11/0721; G06F 11/3419; G06F 18/214; G06F 21/71; G06F 2221/2129; G06N 20/00
See application file for complete search history.

(56) References Cited

U.S. PATENT DOCUMENTS

| | | | |
|---|---|---|---|
| 10,915,425 B2 * | 2/2021 | Wang | G06F 11/3447 |
| 2012/0179898 A1 * | 7/2012 | Betouin | G06F 21/71 |
| | | | 712/E9.016 |
| 2018/0115576 A1 * | 4/2018 | Ridley | H04L 69/16 |

FOREIGN PATENT DOCUMENTS

| | | | | |
|---|---|---|---|---|
| WO | WO-2014149080 A1 * | 9/2014 | | G06F 21/566 |
| WO | WO-2014152469 A1 * | 9/2014 | | G06F 21/52 |
| WO | WO-2015057617 A1 * | 4/2015 | | G06F 11/3419 |

* cited by examiner

*Primary Examiner* — Joseph P Hirl
*Assistant Examiner* — Aayush Aryal
(74) *Attorney, Agent, or Firm* — John C. Pokotylo; Pokotylo Patent Services

(57) ABSTRACT

An aspect of behavior of an embedded system may be determined by (a) determining a baseline behavior of the embedded system from a sequence of patterns in real-time digital measurements extracted from the embedded system; (b) extracting, while the embedded system is operating, real-time digital measurements from the embedded system; (c) extracting features from the real-time digital measurements extracted from the embedded system while the embedded system was operating; and (d) determining the aspect of the behavior of the embedded system by analyzing the extracted features with respect to features of the baseline behavior determined.

20 Claims, 19 Drawing Sheets

Related U.S. Application Data

(60) Provisional application No. 62/667,389, filed on May 4, 2018.

(51) Int. Cl.
| | | |
|---|---|---|
| *G06F 11/07* | (2006.01) | |
| *G06F 11/30* | (2006.01) | |
| *G06F 11/34* | (2006.01) | |
| *G06F 18/214* | (2023.01) | |
| *G06F 21/52* | (2013.01) | |
| *G06F 21/57* | (2013.01) | |
| *G06F 21/71* | (2013.01) | |
| *G06N 3/044* | (2023.01) | |
| *G06N 3/084* | (2023.01) | |
| *G06N 7/01* | (2023.01) | |
| *G06N 20/00* | (2019.01) | |

(52) U.S. Cl.
CPC ........ *G06F 11/3419* (2013.01); *G06F 18/214* (2023.01); *G06F 21/71* (2013.01); *G06N 20/00* (2019.01); *G06F 2221/2129* (2013.01)

| PATH | HARDWARE EVENT (Ex) | | | |
|---|---|---|---|---|
| | INSTR. | LOAD | BRANCH | STORE |
| 1 | 27.3 | 33.3 | 37.5 | 50.0 |
| 2 | 77.1 | 71.4 | 81.5 | 50.0 |
| 3 | 73.3 | 71.4 | 76.2 | 60.0 |
| 4 | 51.5 | 60.0 | 58.3 | 0.0 |
| 5 | 65.9 | 50.0 | 75.0 | 60.0 |
| 6 | 69.8 | 71.4 | 76.2 | 33.3 |
| 7 | 62.8 | 71.4 | 46.7 | 33.3 |

| TEST DATA SET | TRUE POSITIVES (%) | FALSE POSITIVES (%) | TRUE NEGATIVES (%) | FALSE NEGATIVES (%) |
|---|---|---|---|---|
| BASELINE | 96.73 | - | - | 3.27 |
| A1 | - | 0 | 100 | - |
| A2 | - | 0 | 100 | - |
| A3 | - | 0 | 100 | - |
| A4 | - | 0 | 100 | - |
| A5 | - | 2.39 | 97.61 | - |
| A6 | - | 0 | 100 | - |

TABLE 1

FIG. 18

| TEST DATA SET | TRUE POSITIVES (%) | FALSE POSITIVES (%) | TRUE NEGATIVES (%) | FALSE NEGATIVES (%) |
|---|---|---|---|---|
| BASELINE | 100 | - | - | 0 |
| A1 | - | 0 | 100 | - |
| A2 | - | 0 | 100 | - |
| A3 | - | 0 | 100 | - |
| A4 | - | 0 | 100 | - |
| A5 | - | 0.2 | 99.8 | - |
| A6 | - | 0 | 100 | - |

TABLE 2

| $N_W$ | BASELINE DATE CLASSIFICATION ACCURACY (%) | ANOMALOUS DATA CLASSIFICATION ACCURACY (%) | PRECISION | RECALL | $F_1$ SCORE |
|---|---|---|---|---|---|
| 1 | 96.73 | 99.6 | 0.968 | 0.967 | 0.967 |
| 10 | 98.73 | 99.87 | 0.970 | 0.987 | 0.979 |
| 20 | 100 | 99.97 | 1.0 | 1.0 | 0.996 |
| 40 | 100 | 100 | 1.0 | 1.0 | 1.0 |

TABLE 3

FIG. 19

ANOMALY DETECTION IN REAL-TIME MULTI-THREADED PROCESSES ON EMBEDDED SYSTEMS AND DEVICES USING HARDWARE PERFORMANCE COUNTERS AND/OR STACK TRACES

§ 0. RELATED APPLICATION(S)

This application is a continuation of U.S. patent application Ser. No. 16/403,464 (referred to as "the '464 application" and incorporated herein by reference), filed on May 3, 2019, titled "ANOMALY DETECTION IN REAL-TIME MULTI-THREADED PROCESSES ON EMBEDDED SYSTEMS AND DEVICES USING HARDWARE PERFORMANCE COUNTERS AND/OR STACK TRACES," and listing Farshad Khorrami, Ramesh Karri and Prashanth Krishnamurthy as the inventors, the '464 application claiming the benefit of U.S. Provisional Patent Application Ser. No. 62/667,389 (referred to as "the '389 provisional" and incorporated herein by reference), filed on May 4, 2018, titled "ANOMALY DETECTION IN REAL-TIME MULTI-THREADED PROCESSES ON EMBEDDED SYSTEMS AND DEVICES USING HARDWARE PERFORMANCE COUNTERS AND/OR STACK TRACES" and listing Farshad Khorrami, Ramesh Karri and Prashanth Krishnamurthy as the inventors. The present invention is not limited to requirements of the particular embodiments described in the '389 provisional.

§ 1. BACKGROUND

§ 1.1 Field of the Invention

The present disclosure concerns monitoring software processes on embedded processors.

§ 1.2 Background Information

There has been an increasing awareness of the importance of cyber-security for cyber physical systems (CPS) and industrial control systems (ICS) over recent years (See, e.g., S. McLaughlin, C. Konstantinou, X. Wang, L. Davi, A.-R. Sadeghi, M. Maniatakos, and R. Karri. The cybersecurity landscape in industrial control systems. *Proceedings of the IEEE*, 104(5):1039-1057, 2016 (incorporated herein by reference), F. Khorrami, P. Krishnamurthy, and R. Karri. Cybersecurity for control system: A process aware perspective. *IEEE Design & Test Magazine*, 33(5):75-699 83, 2016 (incorporated herein by reference), H. Salehghaffari, P. Krishnamurthy, and F. Khorrami. A game theoretic approach to design a resilient controller for a nonlinear discrete system. In *Proceedings of the IFAC World Congress*, pages 387-392, Toulouse, France, July 2017 (incorporated herein by reference).). Several widely publicized attacks on CPS/ICS have been reported (See, e.g., E. Byres and J. Lowe. The myths and facts behind cyber security risks for industrial control systems. In *Proceedings of the VDE Kongress*, volume 116, pages 213-218, 2004 (incorporated herein by reference), N. Falliere, L. O Murchu, and E. Chien. W32. Stuxnet dossier. *White paper, Symantec Corp., Security Response*, 5, 2011 (incorporated herein by reference), ICS-CERT year in review—2014. [Online]: https://ics-cert.us-cert.gov/sites/default/files/Annual_Reports/Year_in_Review_FY2014_Final.pdf, 2014 (incorporated herein by reference), NCCIC/ICS-CERT Year in Review—2015. [Online]: https://ics-cert.us-cert.gov/sites/default/files/Annual_Reports/Year_in_Review_FY2015_Final_S508C.pdf, 2015 (incorporated herein by reference), ICS-CERT. ICS-CERT year in review. [Online]: https://ics-cert.us-cert.gov/sites/default/files/Annual_Reports/Year_in_Review_FY2016_Final_S508C.pdf, 2016 (incorporated herein by reference, C. Blask. ICS Cybersecurity: Water, water everywhere. [Online]: http://www.infosecisland.com/blogview/18281-ICS-Cybersecurity-Water-Water-Everywhere.html, November 2011 (incorporated herein by reference), J. Robertson and M. Riley. Mysterious '08 Turkey pipeline blast opened new cyberwar. [Online]: http://www.bloomberg.com/news/articles/2014-12-10/mysterious-08-turkey-pipeline-blast-opened-new-cyberwar, December 2014 (incorporated herein by reference), R. J. Turk. Cyber incidents involving control systems. [Online]: https://inldigitallibrary.inl.gov/sti/3480144.pdf, October 2005 (incorporated herein by reference), D. Kravets. Feds: Hacker disabled offshore oil platforms' leak-detection system. [Online]: http://www.wired.com/2009/03/feds-hacker-dis/, March 2009 (incorporated herein by reference), D. Kushner. The real story of Stuxnet. [Online]: http://spectrum.ieee.org/telecom/security/the-real-story-of-stuxnet, February 2013 (incorporated herein by reference), and E. Kovacs. Cyberattack on german steel plant caused significant damage. [Online]: http://www.securityweek.com/cyberattack-german-steel-plant-causes-significant-damage-report, December 2014 (incorporated herein by reference). The ICS Cyber Emergency Response Team (ICS-CERT) has reported between 250 to 300 attacks in 2014, 2015, and 2016. (See, e.g., [3] ICS-CERT, "ICS-CERT year in review." [Online]: https://ics-cert.us-cert.gov/sites/default/files/documents/Year_in_Review_FY2014_Final.pdf, 2014 (incorporated herein by reference); ICS-CERT, "ICS-CERT monitor." [Online]: https://ics-cert.us-cert.gov/sites/default/files/Monitors/ICS-CERT %20Monitor_Nov-Dec2015_S508C.pdf, 2015 (incorporated herein by reference); and ICS-CERT, "ICS-CERT year in review." [Online]: https://ics-cert.us-cert.gov/sites/default/files/Annual_Reports/Year_in_Review_FY2016_Final_S508C.pdf, 2016 (incorporated herein by reference).) The increasing connectivity of computing devices in CPS has made cyber-security increasingly crucial. While general-purpose computer/network security approaches are, in general, applicable to CPS, leveraging the unique temporal behavior and code structure characteristics of CPS devices can enable genuinely effective complementary solutions.

To prevent cyber-attacks, several hardware and software-based solutions have been proposed in the past. Nevertheless, recent events (See, e.g., B. Donohue, "Rsa conference mobile application marred by security vulnerabilities." https://threatpost.com/(incorporated herein by reference); and J. Kirk, "360 million account credentials found in the wild, says security_rm." http://www.computerworld.com/s/article/9246604/360_million_account_credentials_found_in_the_wild_says_security_firm?taxonomyId=82 (incorporated herein by reference).) show that protection mechanisms can be bypassed. In addition, many of the solutions cannot be applied to existing devices since they require modifications to the processor architecture. Using hardware as a root of trust is being adopted. The IBM 4758 (See, e.g., "Ibm pci cryptographic coprocessor." http://www-03.ibm.com/security/cryptocards/pcicc/overview.shtml (incorporated herein by reference).) and similar co-processors follow high-security requirements designed to actively react to attempts to probe or otherwise manipulate the device. If the secure co-processor must, however, execute complex processes, its cost may well exceed the price of the rest of the system to be protected.

Virtual secure coprocessors, such as TrustZone, a security extension in ARM processors (See, e.g., "Arm trustzone hardware architecture." http://www.arm.com/products/processors/technologies/trustztru.php, April 2009 (incorporated herein by reference).), are another countermeasure. In this approach, the processor has two modes: a secure mode and an insecure mode. By design, no process running in the insecure mode can access the resources of the secure mode. The main limitation of TrustZone is that it requires both capable hardware and devices/applications developed according to the TrustZone Ready Program.

To detect malicious modifications while the program is on disk (See, e.g., [42] J. A. Halderman, S. D. Schoen, N. Heninger, W. Clarkson, W. Paul, J. A. Calandrino, A. J. Feldman, J. Appelbaum, and E. W. Felten, "Lest we remember: cold-boot attacks on encryption keys," Communications of ACM, vol. 52, pp. 91-98, May 2009 (incorporated herein by reference); B. Schneier, "Evil Maid Attacks on Encrypted Hard Drives." http://www.schneier.com/blog/archives/2009/10/evil_maid_attac.html, October 2009 (incorporated herein by reference); and M. Dornseif, "Owned by an iPod," in Proceedings of the 2nd PacSec Applied Security Conference, November 2004 (incorporated herein by reference).), motherboards include a Trusted Platform Module (TPM). (See, e.g., R. Ng, "Trusted platform module-tpm fundamental." http://www.asprg.net/aptiss2008/slides/TPM, Fundamentals-raymondng.pdf, August 2008 (incorporated herein by reference).) Usually implemented as a secure coprocessor, the functionality of TPM is constrained enough to allow for an inexpensive implementation that checks for program integrity at load time. While the TPM allows a verifier to obtain a guarantee of what code was loaded into system memory initially, it does not check for program integrity at runtime. Intel's Trusted Execution Technology (TXT) (See, e.g., "Intel trusted execution technology: White paper." http://www.intel.com/content/www/us/en/trusted-execution-technology/trusted-execution-technology-security-paper.html (incorporated herein by reference).) relies on a TPM to provide a trusted way to load and execute applications. Successful attacks on TXT have been demonstrated in the past (See, e.g., R. Wojtczuk, "Attacking intel txt." http://invisiblethingslab.com/resources/bh09dc/Attacking %20Intel %20TXT %20-%20paper.pdf (incorporated herein by reference).), emphasizing the need for layered protection.

In addition to the above approaches, there are several combined software and hardware-based efforts towards providing security and privacy protection against adversary actions. Secure program execution framework (SPEF) (See, e.g., D. Kirovski, M. Drinic, and M. Potkonjak, "Enabling trusted software integrity," in Proceedings of the 10th international conference on Architectural support for programming languages and operating systems, pp. 108-120, 2002 (incorporated herein by reference).) is a dynamic integrity checking approach that uses a hash function along with a cryptographic transformation. SPEF needs extensive modifications to both the microarchitecture and the compiler. Consequently, these changes eventually result in an increasingly performance overhead.

CODESSEAL (See, e.g., [49] O. Gelbart, P. Ott, B. Narahari, R. Simha, A. Choudhary, and J. Zambreno, "Codesseal: Compiler/fpga approach to secure applications," in Proceedings of the IEEE International Conference on Intelligence and Security Informatics, pp. 530-535, May 2005 (incorporated herein by reference).) is a joint compiler/hardware infrastructure for dynamic integrity checking of basic blocks. The pre-computed hashes are stored in the memory of a field programmable gate array (FPGA) that is placed between the main memory and the last level cache. Such a configuration limits performance because it involves hash fetching from memory or disk, hash calculation, and comparison with fetched hash.

Runtime Execution Monitoring (REM) (See, e.g., A. Fiskiran and R. Lee, "Runtime execution monitoring (rem) to detect and prevent malicious code execution," in Proceedings of IEEE International Conference on Computer Design, pp. 452-457, October 2004 (incorporated herein by reference).) is an architectural technique that supports verification of programs based on dynamic integrity checking at basic-block granularity.

Limitations of existing anti-virus programs (See, e.g., "Mcafee anti-virus." http://www.mcafee.com/, 2011 (incorporated herein by reference); "Norton Anti-Virus." http://www.norton.com/, 2011 (incorporated herein by reference); and "AVG Anti-Virus." http://www.avg.com, 2011 (incorporated herein by reference).), anti-spyware (See, e.g., "Adaware Anti-Spyware." http://www.lavasoft.com/, 2011 (incorporated herein by reference); and "Microsoft Windows Defender." http://www.windows.microsfot.com/, 2011 (incorporated herein by reference) (incorporated herein by reference).), and anti-malware (See, e.g., "Microsoft Security Scanner." http://www.microsoft.com/security/scanner/, 2011 (incorporated herein by reference).) tools, have driven the introduction of novel software tools and safe programming dialects. Cyclone (See, e.g., L. Hornof and T. Jim, "Certifying compilation and run-time code generation," in Proceedings of ACM Conf Partial Evaluation and Semantics-Based Program Manipulation, January 1999 (incorporated herein by reference).), and StackGhost (See, e.g., M. Frantzen and M. Shuey, "Stackghost: Hardware facilitated stack protection," in Proceedings of the 10th conference on USENIX Security Symposium, August 2001 (incorporated herein by reference).) are two examples. These mechanisms though have drawbacks such as significant adverse performance impact because of the code bloat and limitations because of the protection of only selected libraries and functions. From a firmware verification perspective, software symbiotes were proposed as an on device binary instrumentation to automatically insert hooks in a randomized fashion in embedded firmware. (See, e.g., A. Cui and S. Stolfo, "Defending embedded systems with software symbiotes," in Recent Advances in Intrusion Detection, vol. 6961 of Lecture Notes in Computer Science, pp. 358-377, Springer Verlag, 2011 (incorporated herein by reference).) Although their mechanism allows the injection of code within the firmware, the symbiotic machines target only control-flow intercept points.

As malware signatures have become more and more complex, the community has been looking into behavior-based malware identification. The solutions check the behavior of a program with regards to the hard disk I/O and the memory subsystem. (See, e.g., M. Christodorescu, S. Jha, and C. Kruegel, "Mining specifications of malicious behavior," in Proceedings of the 1st India software engineering conference, pp. 5-14, ACM, 2008 (incorporated herein by reference); and A. Lanzi, D. Balzarotti, C. Kruegel, M. Christodorescu, and E. Kirda, "Accessminer: using system-centric models for malware protection," in Proceedings of the 17th ACM conference on Computer and communications security, pp. 399-412, ACM, 2010 (incorporated herein by reference).) Recent work also utilized microarchitectural events to detect Android malware and Linux rootkits. (See, e.g., J. Demme, M. Maycock, J.

Schmitz, A. Tang, A. Waksman, S. Sethumadhavan, and S. Stolfo, "On the feasibility of online malware detection with performance counters," in Proceedings of the 40th Annual International Symposium on Computer Architecture, pp. 559-570, ACM, 2013 (incorporated herein by reference).) Moreover, on the classifier side, there are methodologies (See, e.g., M. Bailey, J. Oberheide, J. Andersen, Z. M. Mao, F. Jahanian, and J. Nazario, "Automated classification and analysis of internet malware," in Recent Advances in Intrusion Detection, pp. 178-197, Springer, 2007 (incorporated herein by reference); and U. Bayer, P. M. Comparetti, C. Hlauschek, C. Kruegel, and E. Kirda, "Scalable, behavior-based malware clustering," in Proceedings of Network and Distributed Systems Security Symposium, vol. 9, pp. 8-11, Citeseer, 2009 (incorporated herein by reference).) for classifying malware. These methodologies will be explored in this proposal to assess their effectiveness in combination with the proposed approach in the context of HPCs and stack traces.

While HPCs were originally included into processors as a mechanism to facilitate low-level performance analysis and tuning, HPCs have been utilized in recent years for several security-related applications. For example, HPCs have been used to detect malicious modifications in applications (See, e.g., C. Malone, M. Zahran, and R. Karri. Are hardware performance counters a cost effective way for integrity checking of programs? In *Proceedings of Sixth Workshop on Scalable Trusted Computing*, October 2011 (incorporated herein by reference).) and to detect rootkits (See, e.g., D. Molnar, M. Piotrowski, D. Schultz, and D. Wagner. The program counter security model: automatic detection and removal of control-flow side channel attacks. In *Proceedings of the 8th international conference on Information Security and Cryptology (ICISC'05)*, pages 156-168, 2005 (incorporated herein by reference), X. Wang and R. Karri. Reusing hardware performance counters to detect and identify kernel control-flow modifying rootkits. *IEEE Transactions on Computer-Aided Design of Integrated Circuits and Systems*, 35(3):485-498, 2016 (incorporated herein by reference).) and firmware modifications (See, e.g., X. Wang, C. Konstantinou, M. Maniatakos, and R. Karri. ConFirm: Detecting firmware modifications in embedded systems using hardware performance counters. In *IEEE/ACM International Conference on Computer-Aided Design*, pages 544-551, November 2015 (incorporated herein by reference), X. Wang, C. Konstantinou, M. Maniatakos, R. Karri, S. Lee, P. Robison, P. Stergiou, and S. Kim. Malicious firmware detection with hardware performance counters. *IEEE Transactions on Multi-Scale Computing Systems*, 2(3):160-173, July 2016 (incorporated herein by reference).). This paper extends prior approaches (See, e.g., C. Malone, M. Zahran, and R. Karri. Are hardware performance counters a cost effective way for integrity checking of programs? In *Proceedings of Sixth Workshop on Scalable Trusted Computing*, October 2011, D. Molnar, M. Piotrowski, D. Schultz, and D. Wagner. The program counter security model: automatic detection and removal of control-flow side channel attacks. In *Proceedings of the 8th international conference on Information Security and Cryptology (ICISC '05)*, pages 156-168, 2005 (incorporated herein by reference), X. Wang and R. Karri. Reusing hardware performance counters to detect and identify kernel control-flow modifying rootkits. *IEEE Transactions on Computer-Aided Design of Integrated Circuits and Systems*, 35(3):485-498, 2016 (incorporated herein by reference), X. Wang, C. Konstantinou, M. Maniatakos, and R. Karri. ConFirm: Detecting firmware modifications in embedded systems using hardware performance counters. In *IEEE/ACM International Conference on Computer-Aided Design*, pages 544-551, November 2015, X. Wang, C. Konstantinou, M. Maniatakos, R. Karri, S. Lee, P. Robison, P. Stergiou, and S. Kim. Malicious firmware detection with hardware performance counters. *IEEE Transactions on Multi-Scale Computing Systems*, 2(3):160-173, July 2016, J. Demme, M. Maycock, J. Schmitz, A. Tang, A. Waksman, S. Sethumadhavan, and S. Stolfo. On the feasibility of online malware detection with performance counters. In *Proceedings of the 40th Annual International Symposium on Computer Architecture*, pages 559-570. ACM, 2013 (incorporated herein by reference), A. Tang, S. Sethumadhavan, and S. Stolfo. Unsupervised anomaly-based malware detection using hardware features. In *Research in Attacks, Intrusions and Defenses*, volume 8688 of *Lecture Notes in Computer Science*, pages 109-129. Springer Verlag, 2014 (incorporated herein by reference).) to robustly detect malware in highly multi-threaded applications in real-time embedded devices, specifically Programmable Logic Controllers (PLCs).

Hardware Performance Counters (HPCs) are integrated into all modern processors (including Intel x86, and ARM) and offer an almost zero-overhead technique to count hardware-related events of applications running on the platform. The HPCs are processor dependent and provide information on instructions executed, branches that were taken, hardware interrupts, memory loads and stores, cache misses and accesses, etc. FIGS. 1A and 1B show how one can characterize code execution by the total occurrences of hardware events as well as by temporal patterns and relationships among events.

HPCs have been used to detect malicious modifications in applications [14], to detect rootkits [15,16], and to detect firmware modifications [17,18]. This proposal extends prior approaches [14-20] See recent survey article [12] "The Cybersecurity Landscape in Industrial Control Systems," Proceedings of the IEEE, May 2016 (incorporated herein by reference), and "perspective" article [13] on cyber-security techniques for CPS, "Cybersecurity for Control System: A Process Aware Perspective," IEEE Design and Test Magazine, September 2016 (incorporated herein by reference).

See also, H. Amrouch, P. Krishnamurthy, N. Patel, J. Henkel, R. Karri, and F. Khorrami. Emerging (un-)reliability based security threats and mitigations for embedded systems. In *Proceedings of the International Conference on Compilers, Architectures and Synthesis For Embedded Systems (CASES)*, pages 1-10, Seoul, South Korea, October 2017.

§ 2. SUMMARY OF THE INVENTION

The present disclosure provides an almost zero-cost solution for malware detection and characterization of CPS devices by considering available digital side channels, specifically, hardware performance counters and stack traces on computing platforms. The present disclosure employs deep machine learning for robust, dynamic, and real-time threat monitoring, detection and classification in regular and embedded platforms using digital side channels. One proposed tool is called Tracking Run-time Anomalies in Code Execution (TRACE). The output of TRACE may be used in a vulnerability analysis package to recover a clean state of CPS devices under consideration.

§ 3. BRIEF DESCRIPTION OF THE DRAWINGS

FIGS. 1A and 1B show how one can characterize code execution by the total occurrences of hardware events as well as by temporal patterns and relationships among events.

Figure 5:
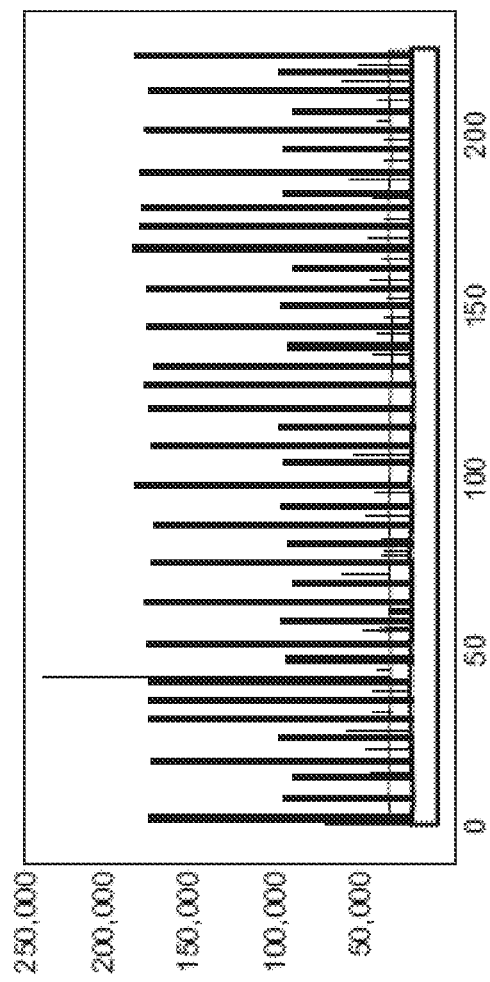
Figure 5:
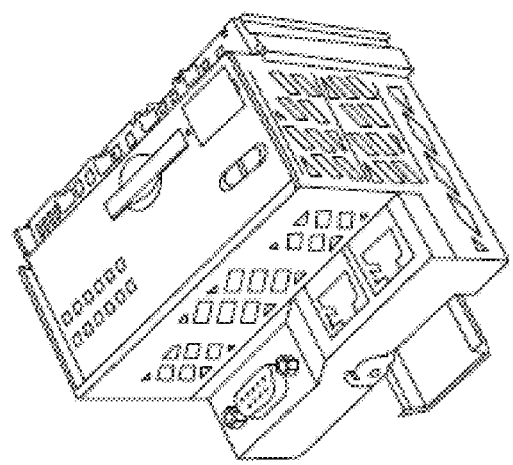

FIG. 5 illustrates samples of HPC measurements collected for an example multi-threaded control logic process (number of instructions). FIG. 5 shows HPC-based profiling by TRACE of a multi-threaded process on an embedded PLC. On the left hand side is the Wago PLC. On the right hand side are HPC measurements of the main control process on the Wago PLC obtained at a 1 kHz sampling rate by TRACE. The control process runs the Structured Text Code that specifies the control logic has 23 threads—I/O, controls, etc.

Figure 6:
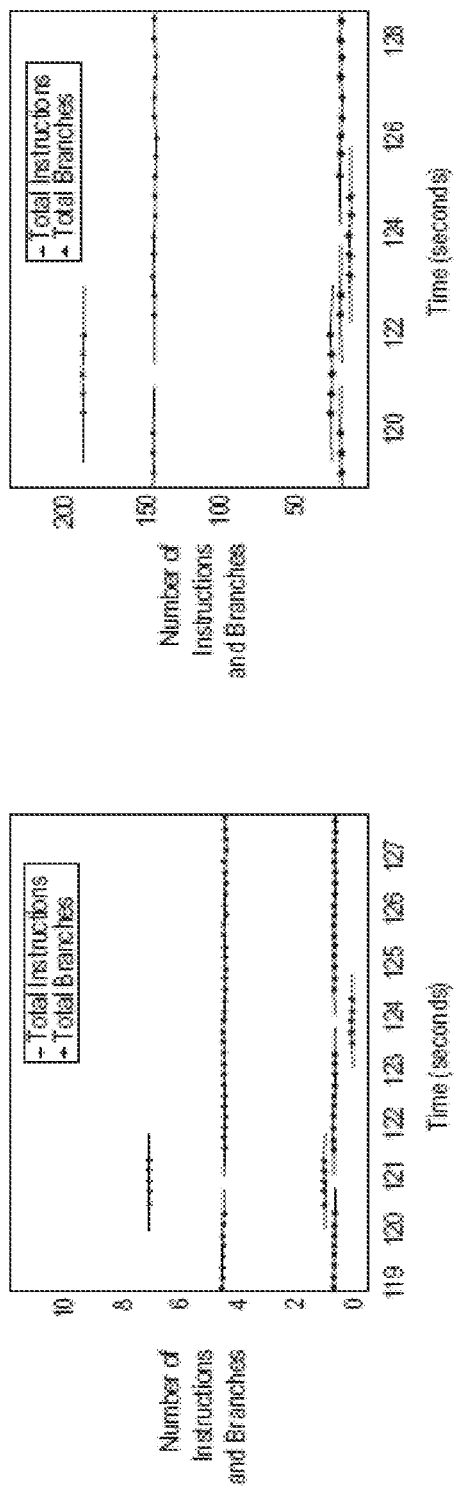

FIG. 6 illustrates feature extraction examples. FIG. 6 shows feature extraction from sliding windows of time series of HPC measurements by TRACE. These time series correspond to PLC_Task thread that executes a user-loaded Structured Text Code within the multi-threaded PLC process shown in FIG. 5. The left hand side plot shows the averages of numbers of instructions and branches for overlapping 1 second long sliding time windows. The right hand side plot shows the root mean squares of numbers of instructions and branches for overlapping two seconds-long sliding time windows.

Figure 7:
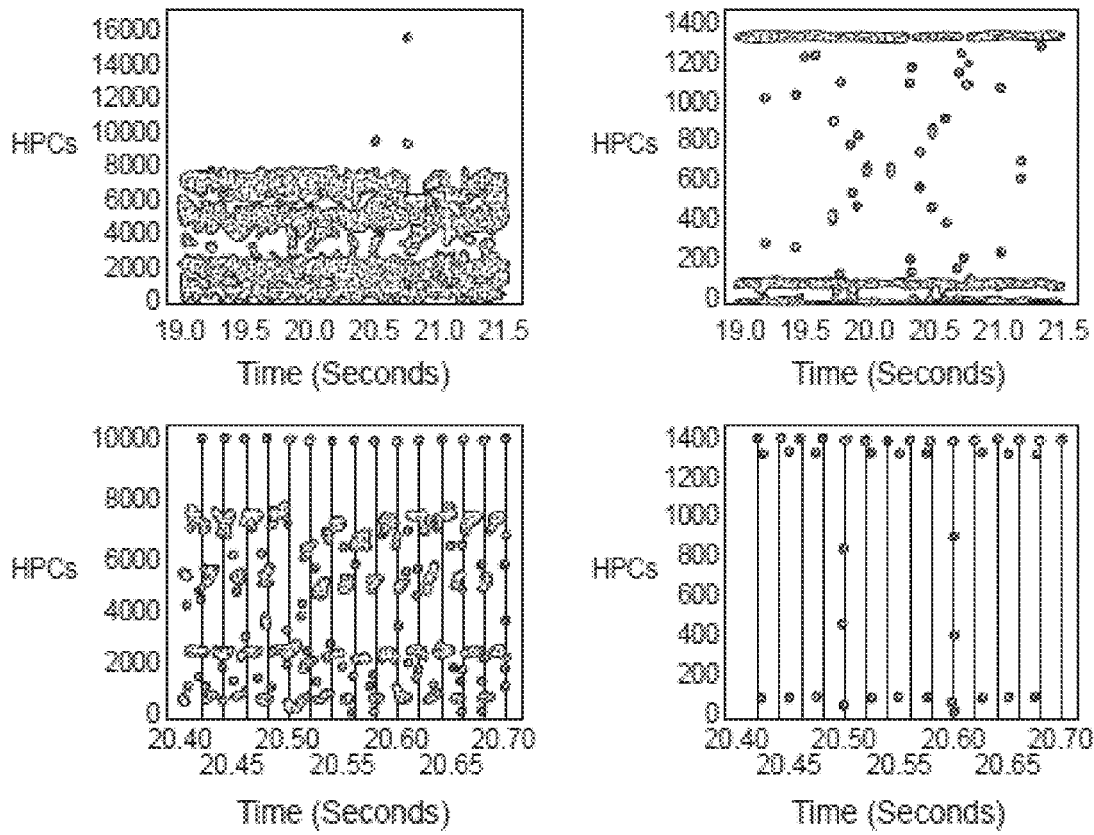

FIG. 7 illustrates an example of combined HPC and stack trace pro filing by a TRACE embodiment of a multi-threaded real-time controller process. FIG. 7 illustrates simultaneous HPC and stack trace based profiling of a multi-threaded real-time controller process. This process has two threads: a control calculation thread; and a background sensor reading thread. The two left hand side figures show the HPC and stack trace measurements for the control calculation thread generated by TRACE. Similarly, the two right hand side figures illustrate the TRACE measurements for the sensor reading thread. The sets of dots correspond to the number of instructions and branches taken measured by TRACE. The vertical lines illustrate time instants at which stack traces are read. The bottom row of plots are zoomed-in view. Further, they show the index of the stack trace measurements at the top of the plots keyed to an enumeration of the distinct stack traces measured over time. In the box, samples of the stack trace measurements 1 and 2, i.e., the first and second of an enumeration of distinct stack traces collected by TRACE are shown. For each trace, the entry in the box shows the hexadecimal addresses captured in the stack trace, the offsets of these addresses relative to the corresponding executable/library objects, the corresponding function names and function offsets, and the executable/library object names.

Figure 8:
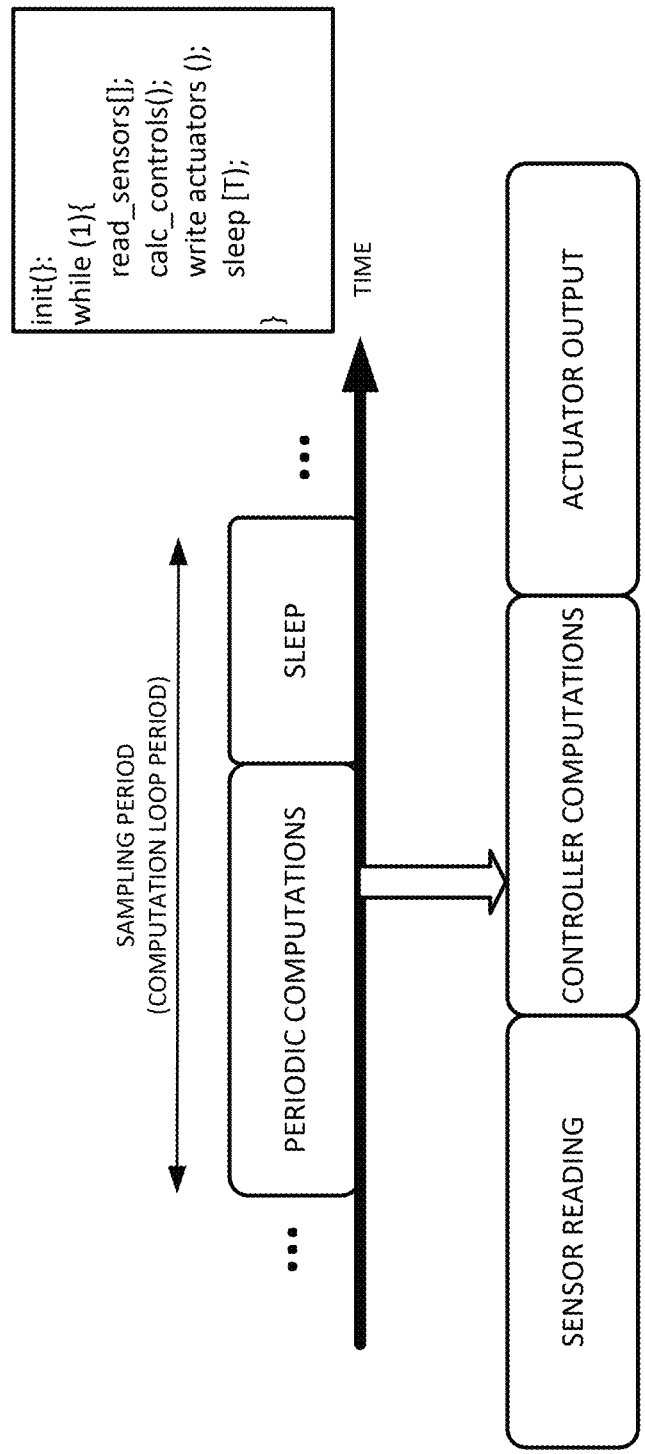

FIG. 8 illustrates that typical implementations of control logic processes in embedded devices are essentially comprised of periodically repeated iterations of sensor reading, control algorithm computations, and actuator writing steps.

Figure 9:
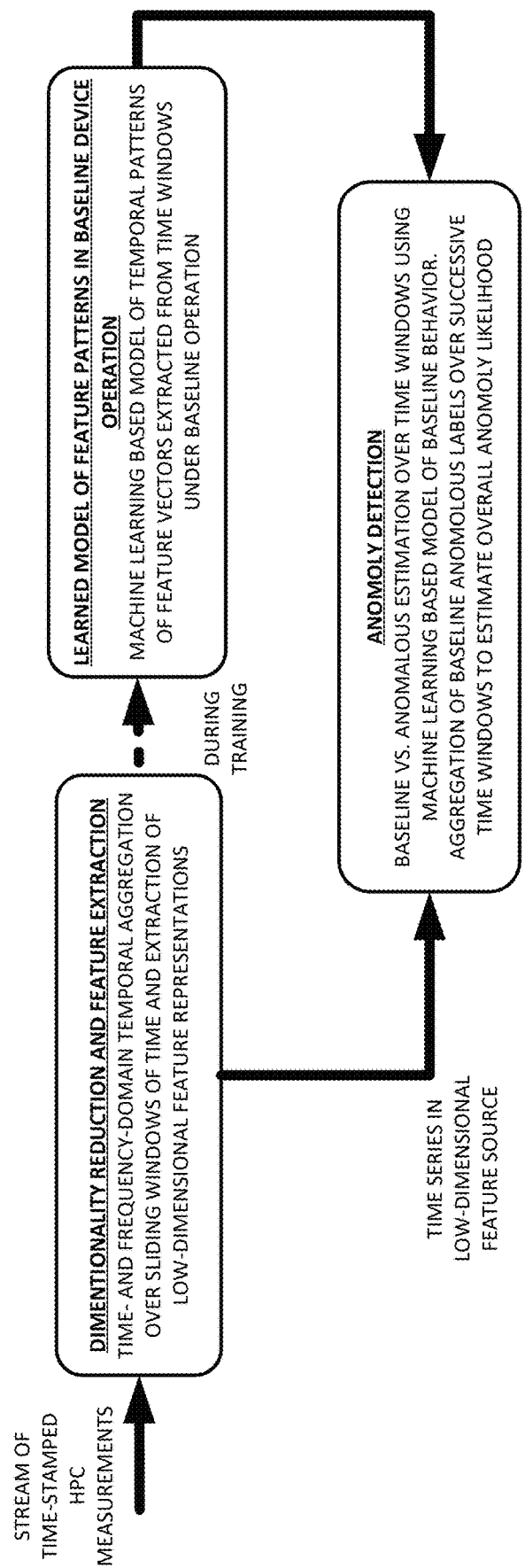

FIG. 9 illustrates the algorithmic structure of an example system consistent with the present description.

Figure 10:
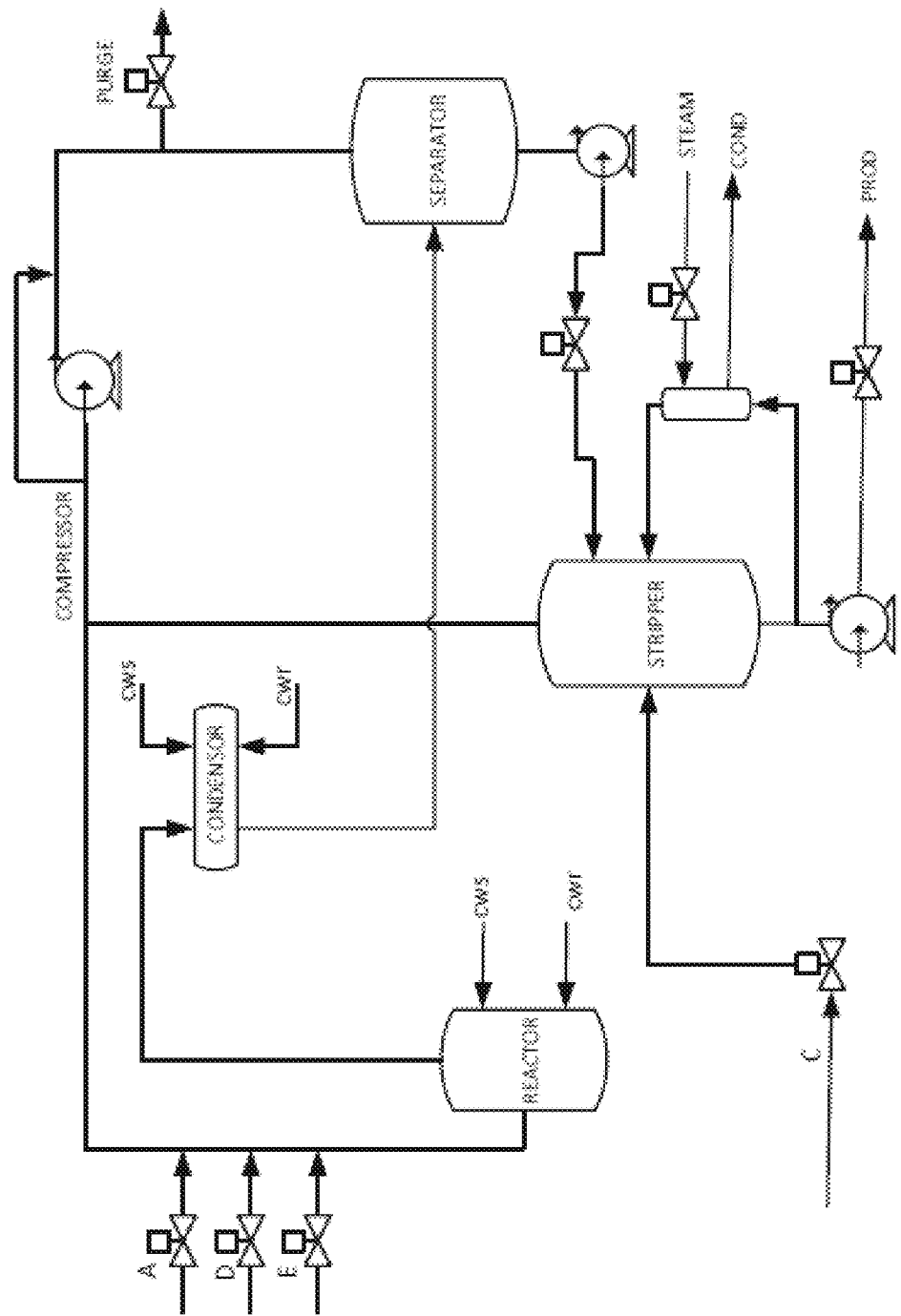

FIG. 10 illustrates the Tennessee Eastman (TE) process, which is a complex open-loop unstable industrial process benchmark modeling the dynamic behavior of a real chemical process.

Figure 11:
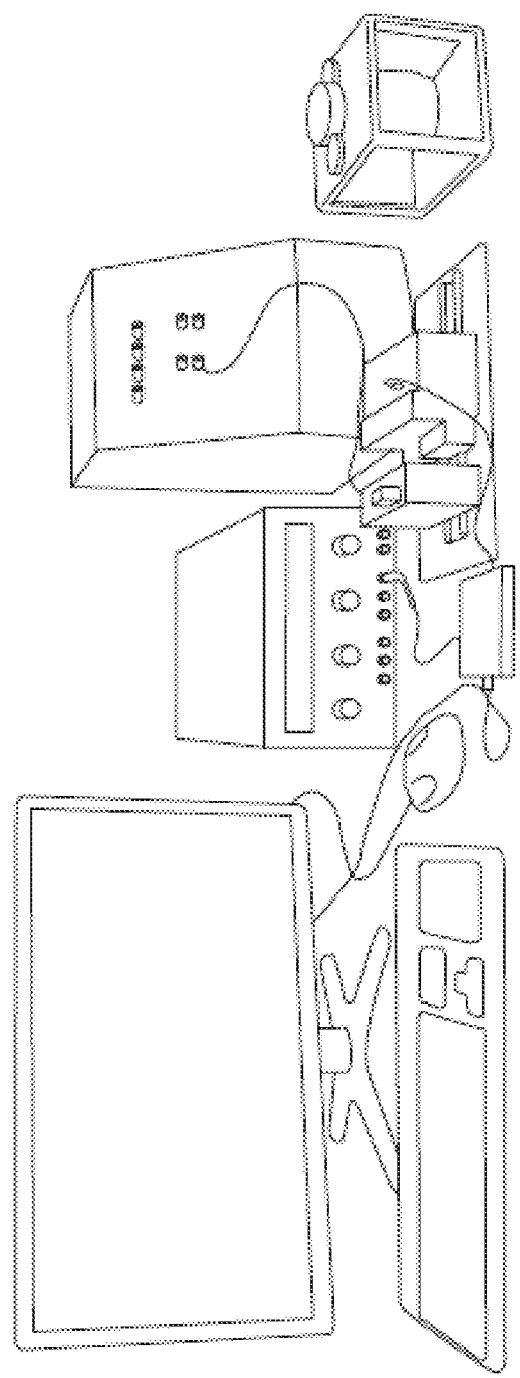

FIG. 11 illustrates an experimental HITL testbed. FIG. 11 illustrates the HITL testbed including TE simulator, Wago PLC based controller, and a DC motor to mimic a flow actuator in the chemical process.

Figure 12:
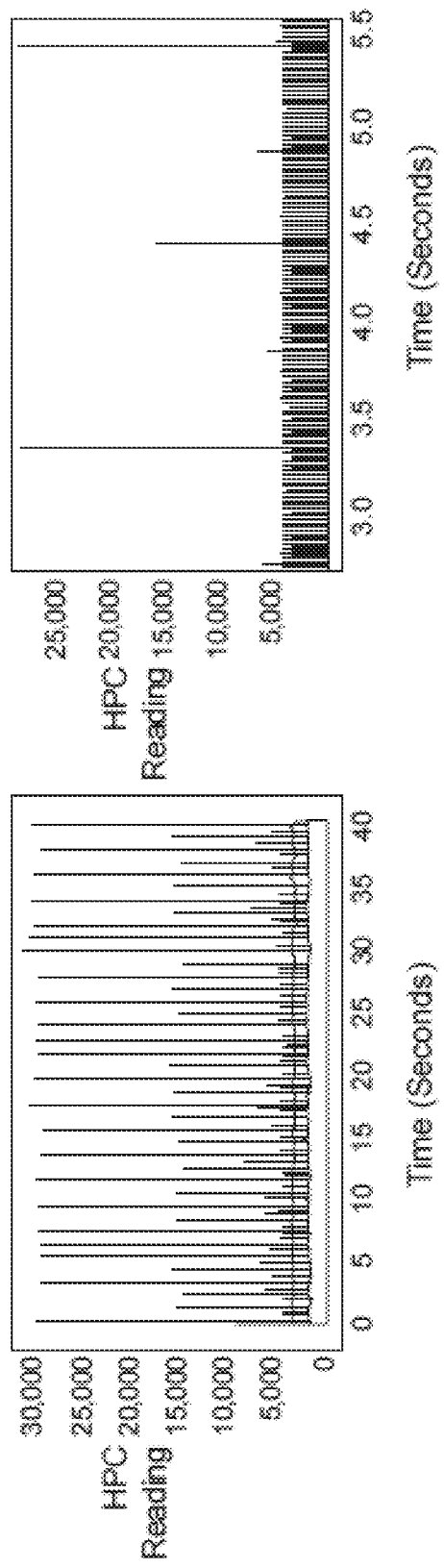

FIG. 12 illustrates samples of HPC measurements collected for an example multi-threaded control logic process (number of branches). FIG. 12 illustrates an example of time series of HPC measurements for a multi-threaded process on an embedded PLC. The plots show HPC measurements of the number of branches for the same process (the main control process on the Wago PLC) as in FIG. 7. The HPC measurements are obtained at a 1 KHz sampling rate for each of the 23 threads in the monitored process. The picture on the right shows a zoomed-in view over a smaller time interval.

Figure 13:
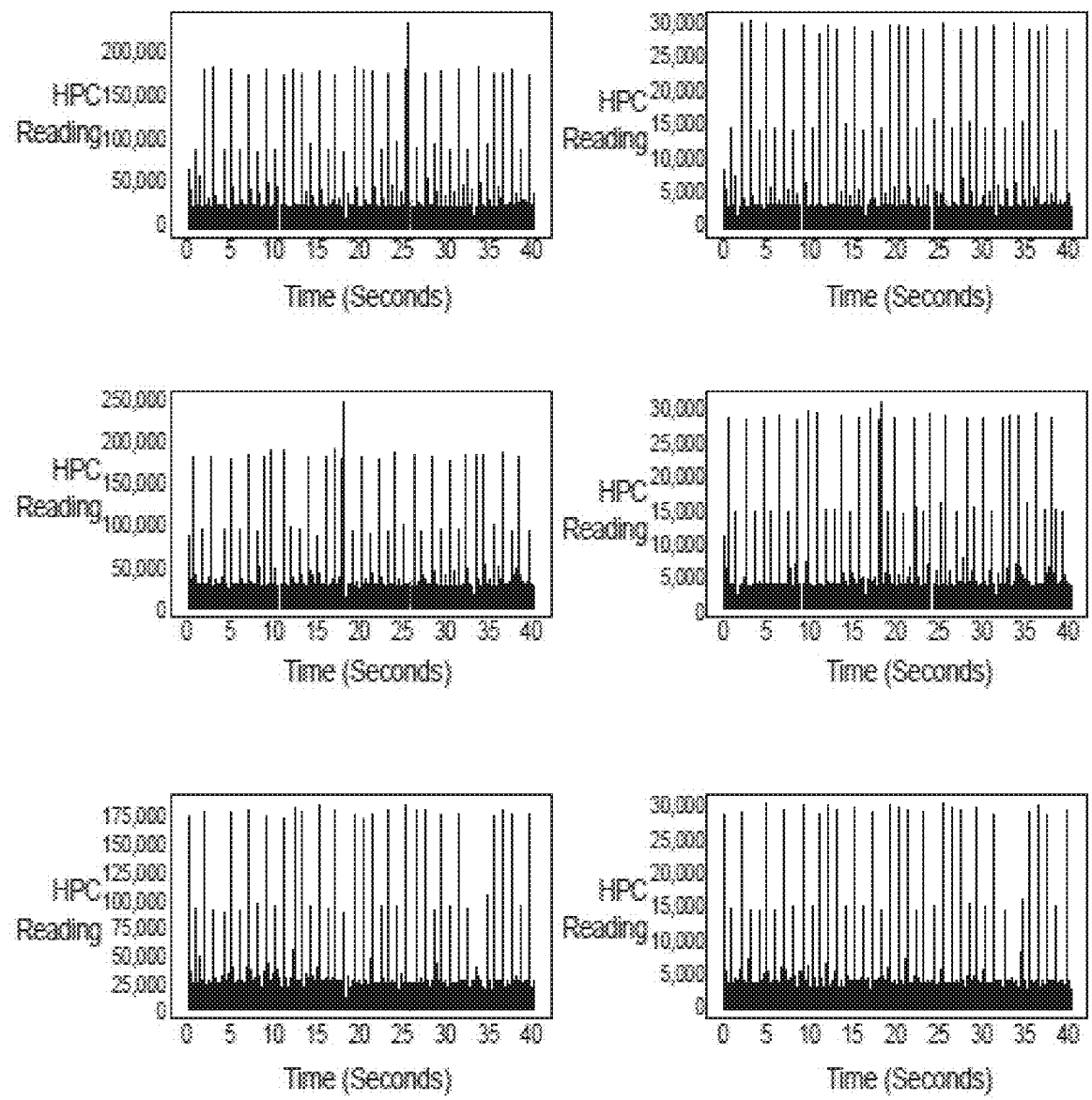

FIG. 13 illustrates a time series of HPC measurements collected for an example multi-threaded control logic process. FIG. 13 illustrates a time series of HPC measurements for the multi-threaded control process on the Wago PLC. The three rows of plots show the HPC measurements for the malware/modifications $A_1$, $A_2$, and $A_3$, respectively. In each row, the plot on the left-side column shows the number of instructions and the plot on the right-side column shows the number of branches. The HPC measurements are obtained at a 1 KHz sampling rate for each of the 23 threads in the monitored process as in FIGS. 5 and 12.

Figure 14:
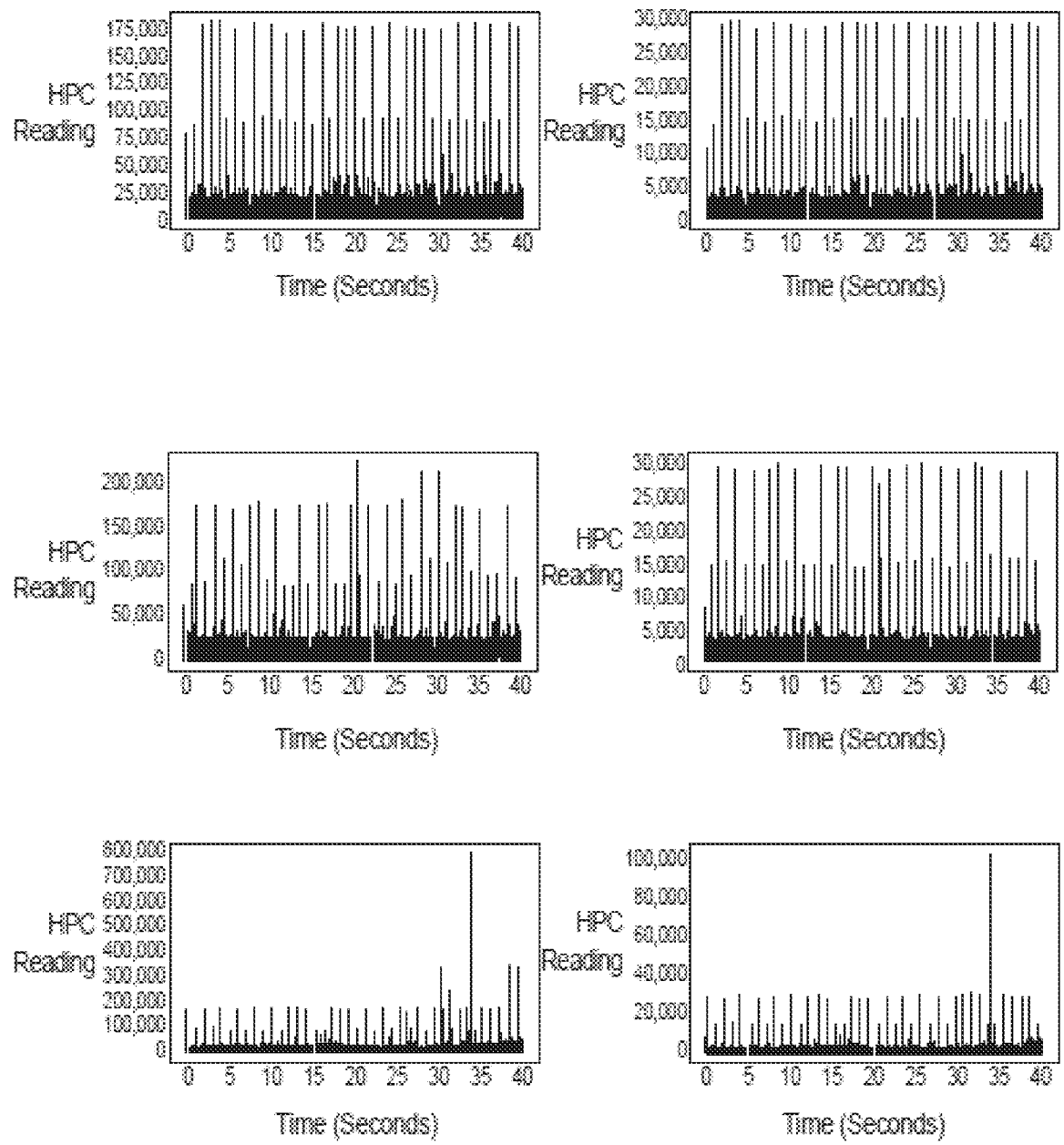

FIG. 14 illustrates a time series of HPC measurements collected for an example multi-threaded control logic process. FIG. 14 illustrates a time series of HPC measurements for the multi-threaded control process on the Wago PLC. The three rows of plots show the HPC measurements for the malware/modifications $A_4$, $A_5$, and $A_6$, respectively. In each row, the plot on the left-side column shows the number of instructions and the plot on the right-side column shows the number of branches. The HPC measurements are obtained at a 1 KHz sampling rate for each of the 23 threads in the monitored process as in FIGS. 5 and 12.

Figure 15:
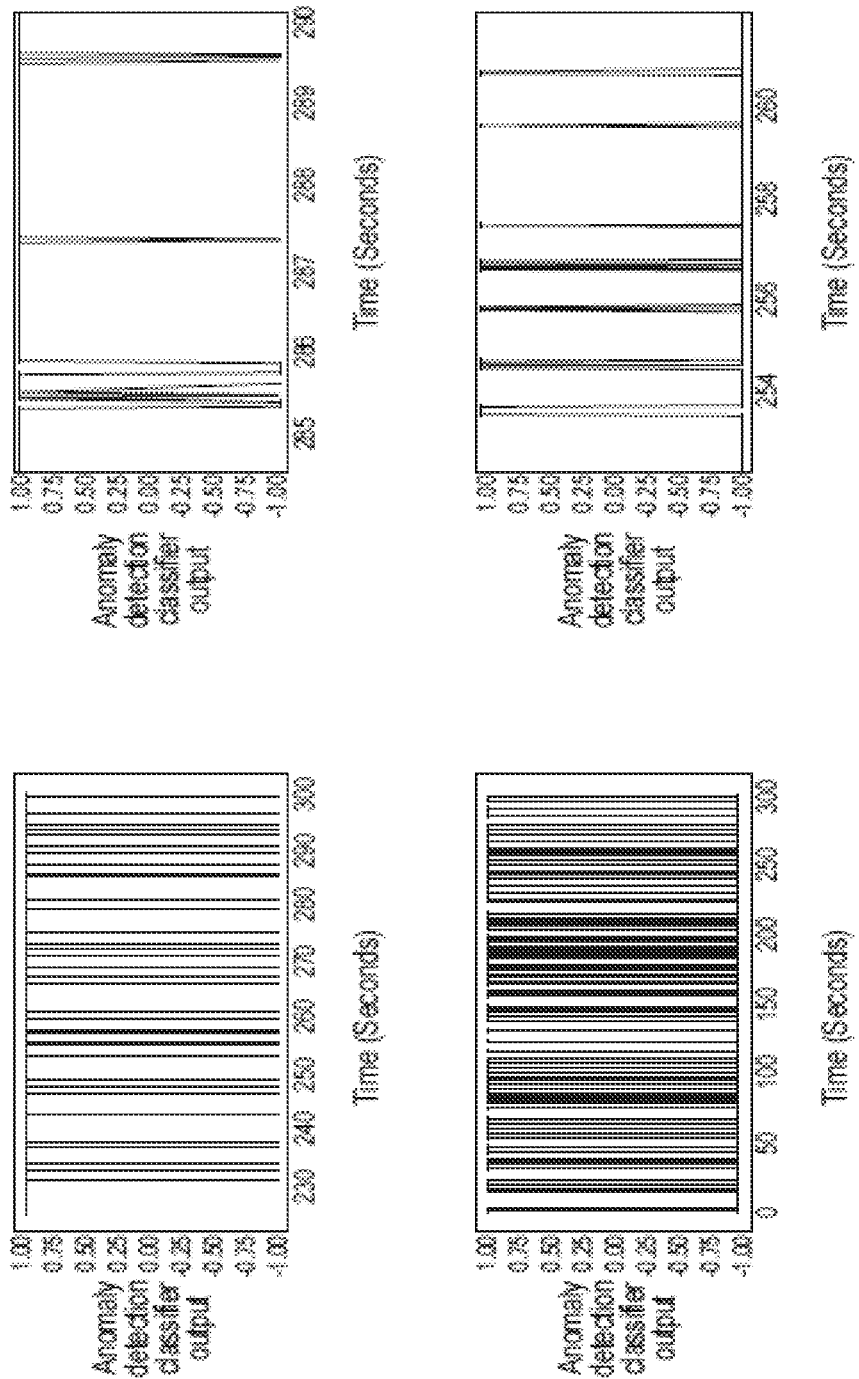

FIG. 15 illustrates anomaly detection results. FIG. 15 illustrates anomaly detection over sliding time windows using the proposed approach without the majority voting over sequences of time windows). The first row corresponds to anomaly detection in a test data set from baseline operation and the second row corresponds to a test data set corresponding to the malware/modification $A_5$. In each plot, values of 1 and −1 indicated that the classifier generated an estimate of non-anomalous (baseline) or anomalous, respectively, when given a sliding time window of data ending at that time instant. Hence, in the first row, points which are at −1 indicate misclassifications while, in the second row, points which are at 1 indicate misclassifications. The right-side figures in each row show a zoomed-in view over a smaller time interval to visualize the (sparse) misclassification errors.

Figure 16:
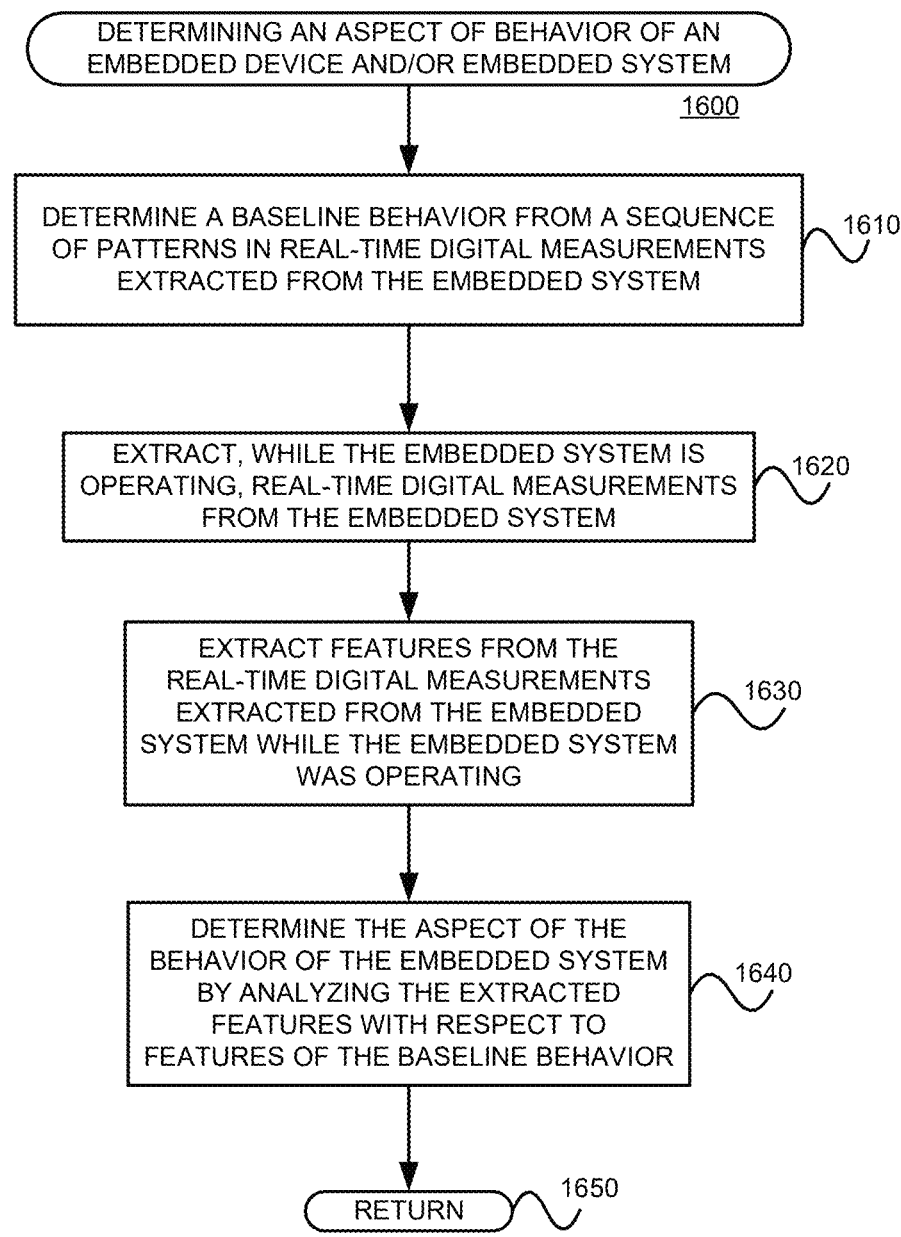

FIG. 16 is a flow diagram of an example method, consistent with the present description, for determining an aspect of behavior of an embedded device and/or an embedded system.

FIGS. 17-19 are tables.

§ 4. DETAILED DESCRIPTION

§ 4.1 Example Environments

Example methods and apparatus consistent with the present invention may be used to monitor embedded processors, such as, for example, those found in critical infrastructure such as smart power grids, as well as Internet-of-Things platforms.

§ 4.2 Example Apparatus

As understood by those having ordinary skill in the art, as used in this application, "section," "unit," "component,"

"element," "module," "device," "member," "mechanism," "apparatus," "machine," or "system" may be implemented as circuitry, such as integrated circuits, application specific circuits ("ASICs"), a field programmable gate arrays ("FPGAs"), field programmable logic arrays ("FPLAs"), etc., and/or software implemented on one or more processors, such as a microprocessor(s). For example, apparatus for performing any of the methods consistent with the present invention may include at least one of (A) a processor executing stored program instructions, (B) an ASIC, (C) an FPGA, and/or (D) a FPLA. A tangible computer-readable storage medium may be used to store instructions, which, when executed by at least one processor, perform any of the foregoing methods.

The present invention is not limited to the example embodiments described above, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

Any references (e.g., publications, articles, etc.) cited in this application are expressly incorporated herein by reference.

§ 4.2.1 System Overview

The example TRACE system described herein uses a time series of real-time measurements during code execution in an embedded processor to detect software modifications/attacks and changes in run-time behavior. Specifically, the approach uses two types of measurements: (1) measurement that capture metrics of processor activity over time intervals; and (2) measurements that represent snapshots of code execution state. While the proposed time series-based anomaly detection approaches are applicable to various modalities of measurements, we consider here, for specificity, particular examples of the two types of measurements described above. Specifically, as measurements indicating processor activity, the proposed TRACE system uses measurements of processor special-purpose registers (in particular, hardware performance counters (HPCs)). As measurements indicating snapshots of code execution state, the proposed system uses measurements of thread-level stack traces. While HPCs provide measurements of processor activity within the time intervals between measurements, stack traces provide snapshots of the code execution state at the sampling instants.

Figure 2:
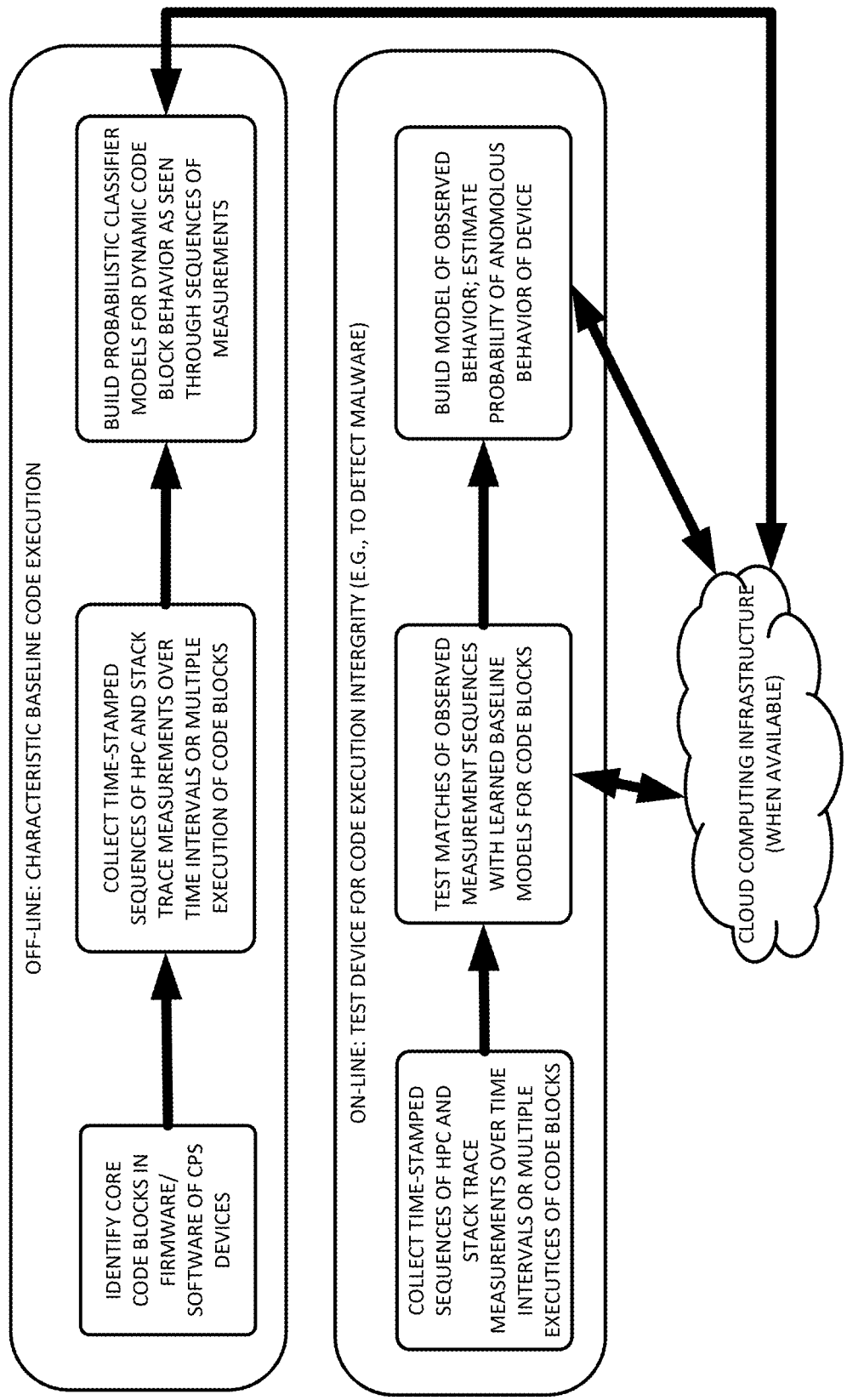
FIG. 2 illustrates an overall structure of a system consistent with the present description.

The time series of measurements of HPCs and of stack traces may be collected asynchronously. The proposed system provides a scalable and robust approach to use these time series of measurements to detect anomalies relative to a baseline. As described further below, the underlying algorithmic structure of the system is based on low-dimensional feature extraction, machine learning, and probabilistic modeling and estimation. The overall structure of the system is shown in FIG. 2.

Unlike signature-based threat detection approaches that rely on prior knowledge of signatures of specific malware, TRACE generates an intricate and multi-faceted model of the baseline device behavior and detects anomalies relative to this baseline. This enables detection of malware that has not been previously seen by using the run-time characteristics of the code execution on the target device rather than using signature-based malware detection.

Various sources of non-determinacy and randomness due to other running processes, run-time input signals and parameters, etc., affect the quantitative measurements of HPCs and stack traces at run-time. Hence, in contrast to prior approaches [14-20], TRACE performs probabilistic correlation between the off-line generated nominal models and the real-time constructed models from a device being tested using robust feature extraction and correlation techniques. Furthermore, to accurately detect anomalies while being robust to noise, TRACE uses temporal patterns seen from a sequence of measurements over a sliding window of time rather than single measurements for a function or at a single time instance. Probabilistic temporal models of HPC and stack trace measurements are estimated from empirical baseline data sets using machine learning algorithms described further below. Furthermore, TRACE uses a multi-time-scale event sequence based dynamic formulation of events extracted from the measurement streams by the machine learning system. The event sequence-based formulation provides a robust discrete-time/discrete-event dynamic model approach to enable a deeper physical view of run-time modifications to code on the target device, and also provides robustness to run-time temporal variations and non-determinacy.

§ 4.2.2 Hardware Performance Counters (HPCs)

Figure 1A:
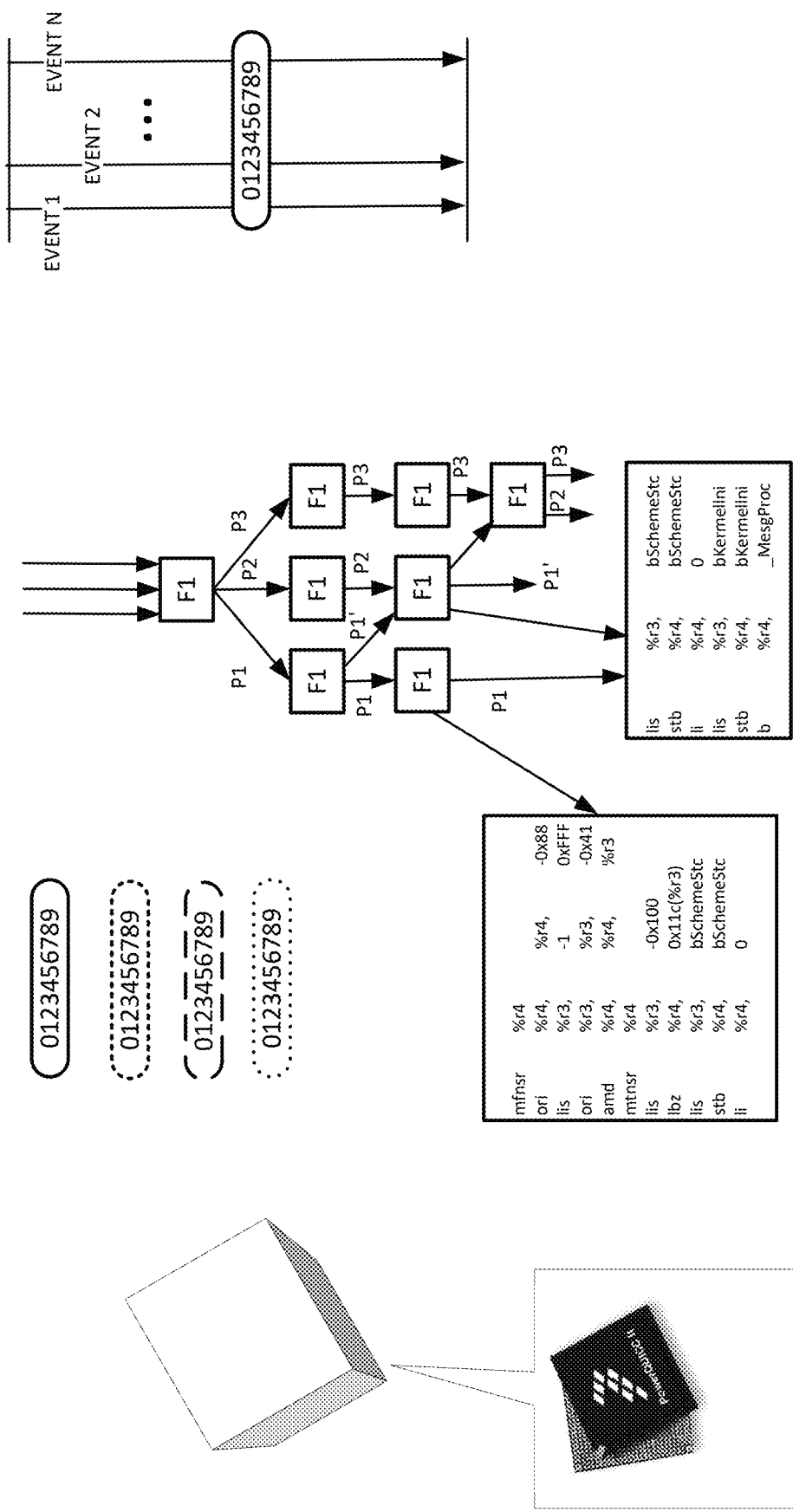

HPCs are provided in most, if not all, modern processors (including Intel x86 and x86-64, ARM, and PowerPC) and offer a zero-overhead technique to count hardware-related events of applications running on the platform. (See FIG. 1.) HPCs are used for low-level performance analysis and code tuning. However, HPCs being a hardware-level functionality are an attractive and flexible capability to verify code integrity with negligible performance overhead.

The set of available HPCs is processor-dependent, especially the processor architecture. Typical HPCs include, for example: number of instructions executed, processor cycles consumed, interrupts triggered, L1 data cache misses and accesses, L1 instruction cache misses and accesses, L1 total (data+instructions) cache misses and accesses, similar data/instruction/total cache misses and accesses for L2 and L3 caches if available, conditional and unconditional branch instructions, memory store instructions, and memory load instructions. Typically, it is not possible to read all available HPCs at the same time due to hardware constraints. However, TRACE can time-multiplex the measurements to read more HPC measurement streams, with some overhead associated with multiplexing.

§ 4.2.2.1 Example HPC-Based System

This sub-section describes an example methodology for real-time monitoring of software processes on embedded processors in cyber-physical systems (CPS). The approach applies to multi-threaded and interrupt-driven processes typical in Programmable Logic Controller (PLC) based implementation of real-time controllers. The approach uses real-time monitoring of Hardware Performance Counters (HPC). This is a lightweight mechanism to profile the real-time code execution behavior in embedded processors. The methodology uses a black-box approach to profile the target process using HPCs (access to the source code of the monitored process is not needed). The time series of HPC measurements over a time window under known-good operating conditions is used to train a machine learning based classifier. At run-time, the trained classifier classifies time series of HPC measurements as baseline (i.e., probabilistically corresponding to a model learned from training data) or anomalous. The baseline/anomalous labels over successive time windows are used to offer robustness to the inherent stochastic variability of code execution on the embedded micro-controller and detect code modifications (i.e., anomalies). The effectiveness of the approach has been demonstrated on an embedded PLC device within a realistic experimental platform comprising a Hardware-In-The-Loop (HITL) testbed emulating a benchmark industrial process.

HPCs are present in all modern processors (including Intel, ARM, and PowerPC) and provide a zero-overhead approach to count various hardware-related events of applications on the processor. For example, HPCs measure numbers of instructions executed, branches taken and other low-level processor activity depending on the particular processor architecture. These measurements are accumulated over the time intervals between successive HPC measurements (i.e., over time windows). A time series of HPC measurements provides a temporal profile of the code being executed on a processor. Given a "known-good" embedded processor, the HPC time series characterizes the expected temporal execution characteristics of the code on the embedded processor when it is running the expected code. This enables detection of changes in code execution behavior. This sub-section describes a lightweight method to detect anomalies using real-time HPC measurements followed by extraction of low-dimension features and machine learning classification into the baseline and anomalous.

This sub-section describes a general algorithmic methodology is developed for real-time anomaly detection in multi-threaded processes (e.g., control logic implementations, sensor processing and sensor fusion algorithmic implementations) in embedded devices such as PLCs. The proposed methodology is based on low-dimensional feature extraction from the multidimensional time series generated by HPC-based monitoring of the target process and machine learning based classification of the time series data to detect mismatches between observed and expected (baseline) temporal behavior. The proposed approach utilizes only "good data," i.e., time series of HPC measurements collected from the embedded device under known-good conditions, and does not require any data from anomalous conditions. This implies that the trained anomaly detector can detect malware/modifications that have not been seen before. The effectiveness of the proposed approach has been demonstrated on a Hardware-In-The-Loop (HITL) experimental testbed based on a benchmark industrial control system representing a chemical process plant. The proposed approach is deployed on a Programmable Logic Controller (PLC) that is utilized for implementation of a control loop in the HITL experimental testbed and it is shown that several types of malware/modifications can be detected using the proposed approach.

The proposed methodology includes an algorithmic methodology that applies to multi-threaded processes wherein the multiple threads could run with vastly different load characteristics and could have a mix of timing-based and event-triggered/interrupt-driven components. Such multi-threaded process structures are typical in real-time embedded controllers. For example, control implementations on PLCs utilize separate threads for analog and digital inputs, for network communication with other PLCs and HMIs, and user-defined control algorithm components. The proposed methodology provides an approach that detects malware (or generally, any unexpected modifications of the target process) that it has not previously seen. The approach does not require apriori malware signatures. The methodology need only use the known-good data from baseline operation of the device, and therefore does not require any data under anomalous conditions. Finally, the proposed methodology provides a blackbox ("outside-the-process") approach for real-time monitoring of unmodified processes for which the source code is unavailable. The HPC measurements are acquired by a separate process that utilizes kernel-level methods to monitor the target process. The target process itself is not instrumented in any way and its operation remains unmodified. Furthermore, by using a machine learning based time series classifier, the methodology does not need knowledge of the internal structure of the monitored process. Also, the anomaly detection uses time windows of the HPC measurement stream without assuming timing synchronization and hence does not require temporal alignment of the HPC measurement time series with any internal structure of the target process or stages of the code being executed.

The multi-threaded structure of the target process is considered intrinsically for anomaly detection. The HPCs from each thread are measured separately. At each sampling time, the "HPC sensor measurements" of the monitored process therefore is a vector of HPC measurements from each thread. The feature extractor component considers the matrix generated from these HPC sensor measurement vectors over a sliding window of time as a multidimensional HPC sensor input from which low dimension features are extracted. The feature extraction includes both per-thread and cross-thread features. While per-thread features model activity patterns in each of the separate threads, cross-thread features model temporal relationships between activity patterns in the different threads.

Various sources of non-determinacy and randomness due to other running processes, processor features such as out-of-order execution and branch prediction, run-time input signals, and parameters affect the quantitative measurements of HPCs at run-time. Hence, the proposed approach performs probabilistic correlation between the off-line generated nominal models and the real-time constructed models from a device being tested using robust feature extraction and correlation techniques that operate on time series of HPC measurements over sequences of time windows.

Unlike signature-based anomaly detection that relies upon prior knowledge of signatures of specific malware, the proposed approach generates an implicit model of the baseline device behavior and detects anomalies relative to this baseline. This enables detection of malware that has not been previously seen by using the run-time characteristics of the code execution on the target device.

§ 4.2.2.1.1 Threat/Attack Model

An adversary modifies a process on an embedded microcontroller such as in a PLC. For example, the most relevant process in this context will be the process that runs the control logic programmed onto the PLC. This control logic is specified via a Structured Text program or through a graphical Integrated Development Environment (IDE) provided by the PLC vendor and is loaded onto the PLC as an executable binary. Hence, one instance of the attack model considered in this sub-section is that an adversary gains unauthorized access to a PLC (using a vulnerability in the implementation of the network protocol used for programming the PLC over the network) and replaces the control logic binary on the PLC. Alternatively, an adversary could use a vulnerability in the implementation of a network protocol to remotely access the PLC to modify the control logic process or re-launch it with modifications. Such modifications include changes to command-line parameters to the control logic process, changes to environment variables, and pre-loading of malicious libraries (e.g., using a mechanism such as LD_PRELOAD in Linux). The detailed steps in an attack are outlined below:

At some time at which an adversary has physical/network access to the embedded device (or to its computational component during manufacturing, integration, or repair), the adversary implants a malware on the device or modifies a running process.

The malware or the implanted modification is activated (e.g., immediately or by a time-based or an event-based trigger) at some time during the operation of the device.

The malware may alter the control logic behavior of the device (e.g., spoofing readings from a sensor, modifying a variable computed in the control algorithm, etc.). Alternatively, the malware may exfiltrate sensitive information from the embedded device. The malware may modify messages being communicated over a network to, for example, feed erroneous information to a human-machine interface (HMI). Depending on the CPS and the role of the embedded device in the CPS, the malware may create malicious effects to hamper the functioning/performance of the CPS.

The proposed real-time monitoring approach described in this sub-section detects such anomalies (i.e., mismatches of observed temporal patterns of processor activity during code execution compared to expected baseline characteristics).

§ 4.2.2.1.2 HPCs

HPCs are available as part of the standard functionalities in all modern processors (including Intel x86 and x86-64, ARM, and PowerPC). HPCs provide measurements (counts) of various hardware-related events during code execution and are used for low-level performance analysis and code tuning. However, HPCs being a hardware-level functionality are an attractive and flexible capability to verify code integrity with negligible performance overhead. Furthermore, since HPCs are available in all modern processors, HPC-based monitoring and code integrity verification can scale to a large class of platforms spanning devices running operating systems (such as Linux) and bare-metal devices.

The set of available HPCs is processor-dependent, especially the processor architecture. Typical HPCs include: number of instructions executed, processor cycles consumed, interrupts triggered, L1 data cache misses and accesses, L1 instruction cache misses and accesses, L1 total (data+instructions) cache misses and accesses, similar data/instruction/total cache misses and accesses for L2 and L3 caches if available, conditional and unconditional branch instructions, branches that were taken, and memory load and store instructions. Typically, it is not possible to read all available HPCs at the same time due to hardware constraints. However, time-multiplexing the measurements can be used to read more HPC measurement streams, although with some overhead associated with multiplexing.

The temporal characteristics of device activity during code execution is characterized by total numbers of occurrences of hardware events as measured by the HPCs as well as by the temporal patterns and relationships between occurrences of the monitored events. However, several sources of non-determinacy and randomness could affect the quantitative computational characteristics during code execution. Sources of non-determinacy/randomness include presence of other active processes, processor-dependent non-determinacy due to factors such as out-of-order execution and branch prediction, run-time inputs, and parameters. Hence, to robustly and reliably detect anomalies based on a time series of HPCs, the approach exploits the probabilistic correlation between the expected baseline behavior and the real-time measurements from the device under test based on robust feature extraction and correlation techniques. Furthermore, to accurately detect anomalies while being robust to noise, the approach utilizes temporal patterns seen from a sequence of measurements over a sliding window of time rather than measurements at each time instant. The time series of HPC measurements from a known-good device is used to learn a model of baseline behavior that implicitly characterizes the temporal patterns in code execution on the monitored device.

§ 4.2.2.1.3 Code Block Granularity and Collection of Time Series of HPC Measurements Depending on the device type and application context, HPC-based code monitoring can be defined at various levels of granularity. The "code blocks" being considered can range in granularity from functions (e.g., some crucial functions in system libraries) to individual processes to the set of all kernel/user-space processes running on the device. To address these levels of granularity, HPCs measurements can be acquired for the entire device, for specific processes therein, for individual threads in a process, or for function libraries (such as system calls) or other application-specific static and dynamic libraries. While the approach can scale to these levels of granularity, we consider monitoring of a specific process (e.g., a crucial process on the target device such as the control logic process on a PLC), which is a particularly relevant application in the context of embedded devices in CPS. The target process will, in general, be multi-threaded, as is typical in real time control logic processes on embedded controllers such as PLCs. HPCs are measured separately for each of the threads in the multi-threaded process and the anomaly detection addresses the multidimensional measurement stream comprising of all HPCs separately measured for each of the threads in the process. For monitoring a target process, there are multiple ways to acquire HPC measurements from the process. These methods include:

i) In-process, by apriori instrumenting the code of the target process.

ii) Connecting from an external monitoring program according to a fixed sampling rate.

iii) Hooking into specific parts of the monitored code (e.g., particular functions) by dynamic instrumentation to invoke the code.

To maximize applicability, the approach profiles the resident threads of an unmodified process in normal operation of the device using the second method above (i.e., HPCs for the threads of the target process are read at a fixed sampling rate by a separate external monitoring process). Thus, the proposed approach does not require access to the source code or the unstripped binaries of the target processes. By using a separate monitoring process that connects on-demand to a running process, the approach does not require relaunching of the target process or modification of environment variables, command-line parameters, etc. For simplicity in describing the proposed approach, a single target process is considered in the algorithmic description below. However, the approach is applicable to simultaneous monitoring of an arbitrary number of target processes. By considering HPC measurements from multiple processes as components within a combined higher-dimensional measurement vector, the feature extraction and anomaly detection can address temporal correlations among activity patterns of different processes.

A time series of HPC measurements are collected for the target process running on the embedded device under known good conditions to establish a baseline. When monitoring a device, the observed code execution characteristics are probabilistically matched against expected (baseline) nominal characteristics to detect anomalies. The overall structure of the system is shown in FIG. 2.

To reduce computational load on the embedded devices (embedded devices in CPS are typically relatively constrained in terms of their computational capabilities), the anomaly detection algorithms are computed on a separate system rather than on-board on the embedded device. The measurement of HPCs for the target process is performed by a lightweight natively compiled executable (the "measurer") that is deployed onto the target device. The HPC measurements are collected to a file, which is then transferred to an analysis system on a separate computational device (e.g., a workstation computer), or can be streamed on-line to the analysis computer. Since the processor (e.g., ARM) in the embedded device is often distinct from the deployment/analysis computer, the lightweight measurer to collect the HPC measurements is cross-compiled to a native binary (for the target embedded device) and then transferred. On the embedded device, the light-weight measurer can use multiple methods to read HPC measurements for the target process including low-level register access, perf_events or perfctr interfaces in the Linux kernel, high-level PAPI (Performance Application Programming Interface) library, Intel PCM (Performance Counter Monitor) for Windows and Linux. In the implementation of the system, a PLC is considered as a representative embedded device and the PAPI library (See, e.g., PAPI (Performance Application Programming Interface). http://icl.utk. edu/papi (incorporated herein by reference).) is used to implement the measurer.

§ 4.2.2.1.4 Training-Time Vs. Run-Time

The proposed approach for malware detection uses the baseline measurements of the target in a known-good state to train a machine learning model. The proposed approach operates in two distinct stages (FIG. 2):

i) Training (Off-line): HPC measurements are collected from the device under known-good conditions. To address the various sources of run-time non-determinacy/randomness, machine learning algorithms are used to learn a probabilistic model of HPC measurement time series corresponding to baseline behavior.

ii) Run-time monitoring (On-line): HPC measurements are collected from the device and classified using the trained machine learning algorithms to estimate likelihoods of the device being in baseline or anomalous states.

As discussed above, the proposed algorithmic approach is described in the context of a single target process (e.g., a crucial process such as the real-time control logic process on a PLC), but is applicable to simultaneous time-correlated monitoring of multiple target processes. The target process can be, for example, identified during baseline training and run-time monitoring using the process name or some other identifying characteristics such as open files/ports, etc.

The training-time machine learning and the run-time anomaly detection stages are illustrated in FIG. 2.

§ 4.2.2.1.5 HPC Time Series and Problem Formulation

As described above, HPC measurements for the target process are collected as a time series with separate measurements for each thread in the target process. Denoting the number of threads in the target process by n and denoting the HPC measurements for thread i at a particular sampling time t by $m_{i,t}$, the complete measurement vector at time t is of the form $\overline{m}_t = [m_{1,t}^T, \ldots, m_{n,t}^T]^T$ Here, each thread-level HPC measurement $m_{i,t}$ is a vector of length r where r is the number of HPCs being simultaneously measured. The number of HPCs that can be simultaneously measured is processor-dependent and is subject to hardware constraints. Measuring additional HPCs requires multiplexing, which however introduces some overhead. Here, for simplicity, we consider $m_{i,t}$ as corresponding to readings for a set of HPCs that can be simultaneously measured. Hence, the combined measurement $\overline{m}_t$ for the target process is a vector of length nr. At each sampling time t, a combined reading $\overline{m}_t \in \mathcal{R}^{nr \times 1}$ is obtained, thus yielding a time series $\{\overline{m}_{t1}, \overline{m}_{t2}, \ldots,\}$ over a sequence of time instants $t_1, t_2, \ldots,$. This sequence of time instants is typically defined based on a fixed sampling rate, i.e., $t_i = t_1 + (i-1)T_s$ where $T_s$ denotes the sampling period. For example, $T_s = 0.001$ s corresponds to a 1 kHz sampling rate, which is typically attainable on embedded processors; on particularly constrained embedded processors, the attainable sampling rate could be lower (e.g., 100 Hz corresponding to $T_s = 0.01$ s).

During the training stage, measurements from a known-good device are collected as a time series over a sufficient time interval. This sequence of measurements forms the baseline data set. During run-time monitoring, the time series of measurements is the test data set and the problem addressed here is the development of a robust matching approach to decide if the test data set matches the characteristics of the baseline data set or is anomalous. For this purpose, feature extraction algorithms are utilized to extract low-dimensional feature representations from the HPC measurements over time windows. The same feature extraction algorithms are used for both the baseline and the test data sets. A machine learning approach is used to learn a model of feature patterns from the baseline data set. Thereafter, the trained machine learning based system is used to classify the test data set as baseline or anomalous. A primary motivation in the development of the proposed approach and indeed a central characteristic of embedded CPS devices, which enables the proposed approach to provide robust anomaly detection, is that the typical code structures in such devices have well-defined and typically periodic patterns. As illustrated in FIG. 8, typical implementations of control logic processes in embedded devices are essentially comprised of periodically repeated iterations of sensor reading, control algorithm computations, and actuator writing steps. Hence, the HPC measurement time series for these processes tends to have approximately periodically repeated patterns although with significant stochastic variations due to various non-determinacy effects as discussed above in Section 4.2.2.1.2, which essentially create stochastic "noise" in HPC readings.

The algorithmic structure of the proposed system is illustrated in FIG. 9 and the algorithmic components are described in further detail below.

§ 4.2.2.1.6 Time Windowing and Low-Dimensional Feature Extraction from HPC Time Series Signals Over a time window, the HPC measurements from the target process form a time series of form $\overline{m}_{t1}, \overline{m}_{t2}, \ldots,\}$ as described above. The HPC measurements over sliding windows of time can be used to form various types of time-domain and frequency-domain feature descriptor characterizations (See, e.g., I. Guyon, S. Gunn, M. Nikravesh, and L. A. Zadeh. *Feature Extraction: Foundations and Applications, Studies in Fuzziness and Soft Computing*. Springer Verlag, New York, 2006 (incorporated herein by reference), C. Bishop. *Pattern Recognition and Machine Learning*. (Springer Verlag, New York, 2006) (incorporated herein by reference), B. Schölkopf and A. J. Smola. *Learning with kernels: support vector machines, regularization, optimization, and beyond (adaptive computation and machine learn-*

*ing*). The MIT Press, Cambridge, M A, 2001 (incorporated herein by reference), V. Vapnik. *The nature of statistical learning theory.* Springer Verlag, New York, 1999 (incorporated herein by reference), K. P. Murphy. Machine learning: a probabilistic perspective. In *Adaptive Computation and Machine Learning series.* The MIT Press, Cambridge, M A, 2012 (incorporated herein by reference), T. Hastie, R. Tibshirani, and J. Friedman. *The Elements of Statistical Learning: Data Mining, Inference, and Prediction.* Springer Verlag, New York, 2009 (incorporated herein by reference), A. Darwiche. *Modeling and Reasoning with Bayesian Networks.* Cambridge University Press, New York, 2009 (incorporated herein by reference)) using several techniques outlined below. These feature descriptors are computed for sliding window segments of the time series signals and possibly multiple temporal lengths, i.e., for the time series signal given by the set of measurements $\overline{m}_t$, the feature extraction addresses time windows of form $\{\overline{m}_t\}$ for t∈ $\mathcal{T}_{(T_1,T_2)}$ where $\mathcal{T}_{(T_1,T_2)}$ denotes all time stamps for the time series signal which are in the time interval $[T_1, T_2)$. Within this time window, features of various types as described further below can be extracted from sliding window segments corresponding to time intervals of form $[\mathcal{T}, \mathcal{T}+\gamma]$ for a sequence of values of $\mathcal{T}$ and $\gamma$. Features can be extracted, in general, over sliding window segments, i.e., with successive $\mathcal{T}$ being, in general, different by smaller than $\gamma$, and for different temporal lengths, i.e., for different values of $\gamma$. The utilization of multiple temporal lengths provides a multi-resolution approach that facilitates learning of temporal patterns that are apparent over different time scales. The possible values of $\gamma$ are picked to be a discrete set $\Gamma$ depending on the typical time scales of the time series signals in the specific application (e.g., depending on the typical control loop sampling periods when monitoring a control logic process, time scales of local features in the time series signals, etc.). Over each considered time window of the signal, features of multiple types can be extracted from the measurement sequence in that time window including:

i) Basic statistics such as max, min, mean, root mean square, variance, skewness, and kurtosis of the measurement data points (HPC measurement samples $\overline{m}_t$) within the time window. These statistics are extracted over sliding time window segments (in general, of different lengths and with overlaps of successive window segments). These statistics are extracted separately for the different threads and for the different HPC modalities. Statistics such as mean and root mean square characterize levels of activity (within the time window segments and in terms of the different HPC measurement modalities such as number of instructions and number of branches).
 ii) Inter-sample rates of changes-based features. Statistics of inter-sample changes include, for example, the means of absolute values of pair-wise differences of HPC measurements between successive sampling times. The computation of the mean of absolute values of point-wise derivatives of the time series signal uses three or more successive points for numerical robustness. Statistics of inter-sample changes characterize patterns of time variations of activity (i.e., derivatives of the activity patterns).
 iii) Histogram based methods (e.g., percentage of samples over the mean, percentage of samples in highest 25%, etc.).
 iv) Frequency domain methods such as Discrete Fourier Transform (DFT) and Discrete Wavelet Transform (Discrete Wavelet Transform), e.g., frequencies (or the mean of these frequencies) corresponding to the highest few peaks in the DFT. The time-domain and frequency-domain dimensionality reduction methods provide an information quantization approach to encapsulate time windows of HPC measurements as low dimensional feature vectors.
 v) Autocorrelation methods, e.g., lag for which highest autocorrelation is achieved (i.e., time shift other than 0 of the sample window segment for which highest autocorrelation is achieved). This feature extracts periodicity characteristics of the time series signal.
 vi) Cross-correlation across threads and across HPC measurement modalities. These features extract characteristics of temporal relationships between activity patterns in different threads and different types of activity patterns.
 vii) Polynomial-based methods, e.g., coefficients of a polynomial representation (e.g., cubic splines and Chebyshev polynomials) computed as the closest fit for the time series signal window segment.
 viii) Compressibility based methods, i.e., a measure of the compressibility (or equivalently information content) of the signal window segment, e.g., number of bits of most compact representation (to within some approximation threshold). This feature can be computed separately for each thread and/or each HPC modality or can be computed as a combined metric for the multidimensional measurement sequence comprising of HPC measurements from all threads.

Given a time window from which a feature vector is to be extracted, features of the various types described above can be extracted from sliding sub-window segments of different lengths within the time window. The feature descriptions obtained from the multi-resolution hierarchy of time window segment lengths (i.e., for different values of $\gamma$ are aggregated by concatenating with the features extracted from the sliding window segment of the top-level $\gamma$ value). Combinations of low-dimensional feature descriptors essentially provide semantic hashes comprising of low-dimensional feature representations of the measurements over time windows. Using these feature extraction techniques, the HPC measurement set over a time window is mapped to a feature vector. This feature vector is the input to a machine learning based classifier.

§ 4.2.2.1.7 Machine Learning-Based Classifier for Anomaly Detection

Using the extracted features, the baseline vs. anomalous classification problem entails the learning of an implicit model of the characteristics of the feature patterns corresponding to baseline behavior and thereafter using the learned model to compare a data set obtained during run-time monitoring to the expected (baseline) behavior. While there are multiple linear and nonlinear classification approaches for this purpose, a Support Vector Machine (SVM) approach provides one flexible and general-purpose methodology that can yield robust classification accuracy. In contrast with linear classification approaches (such as methods based on Principal Component Analysis, i.e., PCA), an SVM can accurately fit complex nonlinear separating surfaces between different categories of data by utilizing a nonlinear kernel (such as the radial basis function, i.e., RBF, or polynomial kernels) to implicitly classify data in a high-dimensional feature space. For this purpose, an SVM utilizes what is often called the kernel trick to effectively compute dot products in an implicit high-dimensional feature space through a nonlinear function in the lower-dimensional input space.

In particular, we utilize the one-class SVM approach to model baseline behavior and detect anomalies that deviate from the baseline. In this approach, the SVM is trained based on "good" data and the trained SVM, when presented with a new input, determines if it appears that the new input is from the same class as the training data or is "different." Hence, this approach is one-class in the sense that there is only one class that the SVM is ever trained for, which in this case, is baseline. The SVM is never specifically trained for any anomalous conditions but simply learns characteristics of baseline data based on the data sets provided for training and then at run-time, decides if an incoming data is similar to the baseline for which it is trained or if it appears different. This provides a very effective approach for the run-time monitoring problem considered in this paper since it is indeed only "good" operational data that would be available in a typical application in a real embedded CPS device. Malware/modifications, essentially by definition, are unexpected and not necessarily known to be of specific types or have specific signatures. Hence, by focusing on learning characteristics of baseline behavior and then determining at run-time if observed data differs from the baseline provides an effective approach to detect malware/modifications that have not been previously seen.

Here, as described in § 4.2.2.1.5 and § 4.2.2.1.6, the input to the SVM is a feature vector extracted from a time window. Specifically, using the notation introduced in Section 4.2.2.1.5 for the HPC measurements, sliding time windows are defined to be of the form $\{\overline{m}_t | t \in (T_0+iT, T_0+iT+\overline{T})\}$ where $T_0$, $T$, and $\overline{T}$ are constants and i=1, 2, 3, .... Here, $T_0$ denotes an initial time, $T$ denotes the shift between successive time windows, and $\overline{T}$ denotes the length of each time window. In general, $T$ is picked substantially smaller than $\overline{T}$, i.e., successive time windows typically have a substantial overlap. This provides a much more robust approach compared to defining a sequence of non-overlapping windows due to multiple reasons. First, the number of time windows can be much larger when overlapping is allowed thereby facilitating robustness to occasional misclassification errors. Second, subtle temporal patterns can be potentially learned (during training time) and discriminated (during run-time monitoring) by extracting features and performing anomaly detection classifications over several sliding partially overlapping time windows. From each such time window, a feature vector is extracted using the methods described in § 4.2.2.1.6.

The feature vectors are extracted for each of the sequence of partially overlapping sliding time windows as described above. Examples of feature extraction are shown in FIG. 6.

While, as described in § 4.2.2.1.6, a wide range of feature types can be incorporated within the proposed framework, each application would typically only require a small subset of these feature types. The determination of a set of feature types that are most efficacious for a particular application would typically depend upon analysis of the typical variations and repeatability of the specific features when operating upon time windows of baseline data. In general, the feature types that are of most effectiveness for a specific application would be ones that exhibit some, but not too much, variation over the set of baseline data so that it is verified that those feature types do exhibit sensitivity to code execution processor activity but are somewhat repeatable during baseline operation. However, the choice of feature types is not particularly critical since as long as a reasonable variety of features are utilized, the addition or removal of a feature type does not typically affect classification performance significantly due to the robust nonlinear classification capabilities of a one-class SVM.

With the notation described above, each time window of the form $\{\overline{m}_t | t \in (T_0+iT, T_0+iT+\overline{T})\}$ is mapped to a feature vector. When training the one-class SVM, the set of feature vectors obtained in this manner from a baseline data set is used as the training data. During run-time monitoring, each such feature vector is classified by the trained SVM as non-anomalous (i.e., baseline) or anomalous. Thus, given a measurement stream during run-time, the sequence of (partially overlapping) sliding time windows yield a sequence of SVM-based classification labels as baseline or anomalous. Thereafter, a simple temporal aggregation is utilized to remove any intermittent misclassification errors (i.e., false negatives when a time window from baseline conditions is classified as anomalous, false positives when a time window under some actual anomaly is classified as baseline). Here, positives and negatives are defined in the context of the machine learning based classification as labeling as baseline and anomalous, respectively. The most simple temporal aggregation given by majority voting over a sequence of time windows (e.g., $N_w$ time windows) typically suffices. It is to be noted that due to the partially overlapping structure of the time window decomposition, a sequence of $N_w$ time windows is of length $(N_w-1)T+\overline{T}$, and not $N_w\overline{T}$, which it would have 454 been if successive time windows were required to be non-overlapping. Since $T$ is typically defined to be much smaller than $\overline{T}$, we see that $(N_w-1)T+\overline{T}$ is much smaller than $N_w\overline{T}$. This highlights another advantage of the sliding time window-based feature extraction and classification in the proposed approach.

§ 4.2.2.1.8 Experimental Studies

In this section, the experimental validation of the proposed approach is demonstrated on an embedded PLC within an HITL testbed that models an industrial control system benchmark process.

§ 4.2.2.1.8.1 HITL Experimental Testbed

The Tennessee Eastman (TE) process shown in FIG. 10 is a complex open-loop unstable industrial process benchmark modeling the dynamic behavior of a real chemical process [DV93, A. Keliris, H. Salehghaffari, B. Cairl, P. Krishnamurthy, M. Maniatakos, and F. Khorrami. Machine learning-based defense against process-aware attacks on industrial control systems. In *Proceedings of the* 2016 *International Test Conference*, Fort Worth, TX, November 2016 (incorporated herein by reference).). The chemical process has five operation units, namely reactor, product condenser, vapor-liquid separator, compressor, and stripper. In this industrial process, gaseous reactants denoted by A through E are combined to produce two liquid products, G and H, and one liquid byproduct F according to the reactions (See, e.g., J. Downs and E. F. Vogel. A plant-wide industrial process control problem. *Computers & Chemical Engineering,* 17(3):245-255, 1993 (incorporated herein by reference), A. Keliris, H. Salehghaffari, B. Cairl, P. Krishnamurthy, M. Maniatakos, and F. Khorrami. Machine learning-based defense against process-aware attacks on industrial control systems. In *Proceedings of the* 2016 *International Test Conference*, Fort Worth, TX, November 2016.) shown below:

$$A(g)+C(g)+D(g) \rightarrow G(liq), \qquad \text{Product 1 (1)}$$

$$A(g)+C(g)+E(g) \rightarrow H(liq), \qquad \text{Product 2 (2)}$$

$$A(g)+E(g) \rightarrow F(liq), \qquad \text{Byproduct (3)}$$

$$3D(g) \rightarrow 2F(liq), \qquad \text{Byproduct (4)}$$

The experimental HITL testbed is shown in FIG. 11. This testbed includes a simulator for the TE process described above and also includes a physical PLC to implement two of the real-time control loops in the industrial process. The TE process is simulated as a Matlab/Simulink model running on a PC. The PC is connected via a custom-built interface board to an external physical PLC to implement a HITL mode of operation. In particular, two of the 479 critical control loops of the TE process are implemented on the PLC. The control loops on the PLC form the aggregate function of two cascaded PI-loops which control the reactor pressure and the reactor purge rate. The TE process is a reasonably intricate system that is representative of real-world industrial processes. The TE process comprises of 50 states, 41 measured variables with Gaussian noise components, 12 manipulated variables, and 13 disturbance signals that can be applied to the system.

(a) PC running the Matlab/Simulink simulation model of the TE process.

(b) Interface electronics to connect the PC-based TE simulator to the external physical PLC. The interface board includes electronic components for voltage level-shifting, serial interface, and digital-to-analog and analog-to-digital conversion to interface the digital computer with the analog input and output of the PLC. An ethernet connection between the PC and the PLC is used for reprogramming the PLC via Wago's CoDeSys integrated development environment (IDE). The ethernet connection is also used to transfer the compiled lightweight measured binary to the PLC via ssh.

(c) The Wago PLC unit running the control loops as described above.

(d) A rotary servo motor (with gear train) connected to the output of the PLC to mimic a physical flow actuator (e.g., a pump) in the industrial process.

The proposed approach for run-time monitoring is implemented on the physical PLC hardware unit integrated into the HITL testbed. The PLC utilized is described in § 4.2.2.1.8.2, below. The experimental HITL testbed provides a physically realistic scenario with physical instrumentation representative of typical industrial control systems.

§ 4.2.2.1.8.2 Wago PLC as the Target Embedded Device

A Wago PLC (See, e.g., Wago programmable fieldbus controllers. http://www.wago.us/products/components-for-automation/modular-io-system-ip-20-750753-series/plc/overview.) is utilized here as a representative embedded CPS device. As described above in § 4.2.2.1.8.1, the Wago PLC is integrated into a HITL experimental testbed that models an industrial control system benchmark process and is utilized to implement two of the control loops in the closed-loop process. The Wago PLC contains an ARM Cortex A8 processor running a custom real-time Linux distribution. The control logic (including control algorithms, parameters, etc.) for the PLC is specified using a Structured Text program (IEC 61131-3 standard), which runs on the PLC as a highly multi-threaded process (e.g., 23 threads—with separate threads for I/O, controls, handling of events with different priorities, etc.). The Structured Text code is compiled into a native binary via CoDeSys IDE of the PLC. This resulting binary is transferred to the PLC via ethernet or serial and is automatically loaded using pre-installed binaries on the PLC.

For run-time monitoring of the control logic process running on the PLC, a separate light-weight measurer process is utilized as described in § 4.2.2.1.3. Using the PAPI library, the measurer process remotely reads HPC measurements corresponding to the target process (which is specified to the measurer using the process name). HPC measurements are collected at a fixed pre-specified sampling rate (e.g., 1 kHz). The light-weight measurer is implemented in C++ and is cross-compiled (using the ARM gcc cross-compiler). The compiled measurer binary is loaded to the PLC via ssh and is then started from the command line. The HPC measurements can be either logged to a file for a specified time interval (and then remotely processed) or directly streamed over ssh to the anomaly detection program running on a separate computer.

The ARM processor in the PLC provides several HPC measurement modalities including number of instructions, number of branches, number of cycles, number of L1 instruction cache misses, etc. However, there is a hardware constraint that only two HPC modalities can be measured simultaneously. While time-multiplexing can be used to read more than two HPC modalities, there are overheads associated with multiplexing. Here, for experimental testing of the proposed approach, we consider the two HPC modalities given by number of instructions and number of branches. Samples of HPC measurements collected for this multi-threaded control logic process are shown in the right-side picture in FIG. 5 (number of instructions) and in FIG. 12 (number of branches). As discussed in § 4.2.2.1.3, HPCs are measured separately for each of the threads in the target process. Hence, with two HPC modalities (number of instructions and number of branches) being measured, the HPC measurement vector at each sampling instant is a vector of length 2n where n denotes the number of threads in the target process. From a time window of these measurement vectors, feature descriptors are extracted as described in § 4.2.2.1.6 and a one-class SVM based classifier is trained as described in § 4.2.2.1.7.

§ 4.2.2.1.8.3 Sample Real-Time Controller Code on PLC and Modifications

As a representative example of a Structured Text control logic code deployed onto the Wago PLC, a proportional-integral-derivative (PID) controller implemented as part of a control loop on the Wago PLC in the TE HITL testbed is considered. The core controller code considered for this purpose is shown in FIG. 13. As described in § 4.2.2.1.8.2 above, the Structured Text control logic code is compiled into a native binary and loaded onto the PLC using the CoDeSys IDE of the PLC. The plots of HPC measurements in FIGS. 5 and 12 correspond to this native binary when run on the PLC in combination with the pre-installed binary components on the PLC.

As representative malware/modifications, several variants of this Structured Text control logic code are considered to reflect several practically relevant types of attacks:

i) A1: overriding 549 of the input (by introducing an additional line of code to override the value of the input to the PID code, i.e., INPUT)

ii) A2: saturating of the input (by introducing two additional lines of code with an IF condition on the input value)

iii) A3: disabling the PID control code (by commenting out the entire PID block)

iv) A4: modifying the PID code to set it to "manual" mode (i.e., fixing the output value to be a constant)

v) A5: modifying the PID controller structure to make it a cascade of two PID controllers instead (i.e., by sending the output of a PID controller to a second PID controller as its input and using the output of the second PID controller as the overall controller output)

vi) A6: overriding 560 of the output (by introducing an additional line of code to override the value of the output of the PID code, i.e., OUTPUT)

HPC measurements of numbers of instructions and numbers of branches for these malware/modifications are shown in FIGS. 13 and 14. It is to be noted that these modifications are extremely small (e.g., just one additional line of code in each of attacks A1 and A6). Hence, the HPC measurement time series for the baseline and for the malware/modifications listed above are very similar in their macroscopic aspects. Note that the intermittent spikes in HPC measurements are due to various non-deterministic effects as was discussed in § 4.2.2.1.2 and cannot reliably be used to distinguish between baseline and anomalous data sets. Instead, a robust and accurate classification of baseline vs. anomalous has to rely upon the subtle temporal patterns in the time series of the HPC measurements. For this purpose, sliding time windows are considered as discussed in § 4.2.2.1.6 and feature vectors are extracted, which are then utilized for SVM-based classification of baseline vs. anomalous.

§ 4.2.2.1.8.4 Anomaly Detection Results Using Proposed Approach

Using the notation in § 4.2.2.1.7, a sequence of sliding time windows is defined to be of the form $\{\overline{m}_t | t \in (T_0 + iT, T_0 + iT + \overline{T})\}$ with $T = 0.025$ s and $\overline{T} = 0.25$ s. Here, since the target process has 23 threads and we are measuring two HPC modalities (number of instructions and number of branches), the HPC measurement vector at each sampling time instant is of dimension 46. The HPC measurements are collected at a sampling rate of 1 kHz. Hence, the values of the parameters T and $\overline{T}$ defined above correspond to a sequence of sliding time windows with each time window being of length 250 samples and with a shift of 25 samples between two successive time windows. Hence, as discussed in § 4.2.2.1.7, there is substantial overlap between successive time windows.

From each time window, features are extracted using the techniques in § 4.2.2.1.6. As discussed in § 4.2.2.1.7, while a wide variety of feature types can be used, an adequate set of features is somewhat application dependent. Based on analysis of variations and repeatability of various feature types for baseline data as discussed in § 4.2.2.1.7, a small set of feature types was defined for this application. In particular, the feature vector was defined to include means, standard deviations, means of inter-sample changes, and percentages over median over the time window for each HPC modality and each thread. These features are computed separately for each of the considered HPC modalities and each thread. The feature vector was further simplified by considering only the subset of threads (7 threads) that exhibited some level of activity (to ignore quiescent background threads). Additionally, the cross-correlation with zero lag (after subtracting the means) of the HPC measurements corresponding to numbers of instructions for two of the threads (the PLC Task thread and the Modbus TCP thread) was also included in the feature vector. Variations of this feature vector (with inclusion of a few additional features or of a few features) were also considered and it was found that as long as a sufficient variety of feature types is utilized, small changes of feature vector composition do not tend to significantly impact classification performance.

HPC measurement data sets were collected from the Wago PLC over a time interval of 300 seconds for the baseline code and for each of the six modifications described above in § 4.2.2.1.8.3. From the baseline code, the first 75% was utilized as the training data for the one-class SVM. The remaining 25% of the baseline data set and all the data sets for the six modifications are utilized as the test data sets. Note that the training of the SVM utilizes only the baseline data and does not utilize any data from the anomalous conditions. A radial basis function was utilized as the kernel for the SVM.

After training, the SVM was tested on the each of the test data sets. The anomaly detection results over the sliding time windows are illustrated in FIG. 12. The points shown in the plots in FIG. 12 correspond to the SVM-based classification for feature vectors extracted from each of the sequence of partially overlapping sliding time windows (the classification for each time window is represented by a point at the end of that time interval in the plots in FIG. 15). The trained SVM provided a 100% accuracy for the malware/modifications A1, A2, A3, A4, and A6 as shown in Table 1 of FIG. 17. Hence, the plots for these malware/modifications are not shown in FIG. 15. The anomaly detection accuracies for the baseline test data set and the data set for malware/modification A5 are also shown in Table 1. Note that in Table 1, entries that do not have any relevant number are marked as '-'. For example, false positives do not have any relevance when considering classification of a baseline test data set since a false positive is defined as an instance that is actually corresponding to some anomaly, but is classified as baseline. Note that the plot for the baseline test data set in FIG. 15 starts at time t=225 s since the part of the data set before this time is utilized as the training data set. Note that none of the data sets for the malware/modifications are utilized in the training of the classifier.

The anomaly detection results in FIG. 15 are for each time windows separately and do not utilize any temporal aggregation over a sequence of sliding time windows. Now, by taking sequences of sliding time windows into account to determine overall baseline vs. anomalous labels, it is seen in Table 2 of FIG. 18 that close to 100% accuracy is attained by simply temporally aggregating (using majority voting) over a sequence of sliding time windows as described in § 4.2.2.1.7 so as to mitigate the sparse misclassification errors. In Table 2, the parameter $N_w$ is defined to be 20 (i.e., each sequence of 20 successive partially overlapping sliding time windows is utilized to emit baseline/anomalous labels as discussed in § 4.2.2.1.7).

The anomaly detection accuracies for a few different settings of Nw are summarized in Table 3 of FIG. 19. Here, precision P is defined as $$p = \frac{p_t}{p_t + p_f}$$

where $p_t$ denotes the number of true positives (i.e., time windows that correspond to baseline operation and are classified as baseline) across all the test data sets and $p_f$ denotes the number of false positives (i.e., time windows that correspond to some anomaly, but are classified as baseline). The recall r is defined as $$R = \frac{p_t}{p_t + n_f}$$

where $n_f$ denotes the number of false negatives (i.e., time windows that correspond to baseline operation, but are classified as anomalous). The $F_1$ score is defined to be the harmonic mean of the precision and recall scores, i.e., $$F_1 = \frac{2PR}{P+R}.$$

§ 4.2.3 Stack Traces

Stack traces capture the sequence of stack frames that are active at a specific instance during the code execution. When a function is called, a stack frame is created. Hence, a stack trace provides a snapshot of the nested functions that have been invoked at a particular time in the code execution. Each stack frame has a memory address representing the program counter value at that time instant if the code execution were to return to that frame. By referring to the memory maps for that process maintained by the operating system kernel, one can identify the executable and library objects corresponding to the memory addresses of the stack frames. One can then compute the offsets within these executable and library objects corresponding to these memory addresses. While the memory addresses of program locations are not the same in successive invocations of a program (due to address space randomization), the offsets within the executable and library objects remain the same.

For anomaly detection, it is important to map process memory addresses in captured stack traces to executable/library offsets. Also, the offsets corresponding to program counters can be mapped to offsets of the function start addresses and function names corresponding to the memory addresses in the stack trace. (The level of detail in the stack trace measurements and function name correspondences depends on the optimization level and compilation flags utilized for the target processes.) Stack traces are collected individually for each thread within a target process. Each thread-level stack trace provides an instantaneous snapshot of the execution state of the thread with the computed offsets within the executable/library objects being a signature that is repeatable across multiple invocations of the program. Stack traces can be read using tools such as libunwind [24] along with the ELF and DWARF libraries for analysis of binary executables and shared libraries. On other operating systems such as various real-time operating systems and Microsoft Windows, stack traces can be read using functions from the appropriate operating system APIs (e.g., the Windows API).

§ 4.2.4 Code Blocks and Measurement Mechanisms

Depending on the platform type and application context, the "code blocks" in a deployment of the example TRACE anomaly detection system can be considered at different levels of granularity. TRACE can use measurements for the entire platform, for a process therein, for individual threads in the process, or for function libraries (such as system calls) or other application-specific static and dynamic libraries. The underlying TRACE algorithmic methodology scales across these levels of granularity. A typical deployment of TRACE will consider all threads (across all running processes) on a device and the set of system and application libraries. The HPCs and stack traces can be measured in three modes of operation:

i) In-process, by instrumenting the target code apriori.
ii) Connecting from an external monitor program according to a fixed sampling rate.
iii) Hooking into specific parts of the monitored code (e.g., particular functions) by binary instrumentation to invoke the code.

To maximize applicability, TRACE profiles the resident threads in normal operation of the device using the second operation mode (i.e., TRACE reads these digital side channels at a fixed sampling rate). In this mode TRACE does not require access to the source code or the unstripped binaries of the resident processes and can work with unmodified binaries. To profile libraries, TRACE uses the first operation mode in conjunction with specially crafted code that invokes functions in the libraries being tested.

§ 4.2.5 Trace: Training-Time Vs. Run-Time

TRACE uses the baseline measurements of the target device in a known-good state to train a machine learning model. TRACE operates in two distinct stages (See FIG. 2.):

i) Training: HPC and stack trace measurements are collected from the device running a known good code. To address the various sources of run-time non-determinacy/randomness, machine learning algorithms are used to learn a probabilistic model of HPC and stack trace signatures corresponding to baseline behavior.
ii) Run-time monitoring: HPC and stack trace measurements are collected from the device and classified using the trained machine learning algorithms to estimate likelihoods of the device being in baseline or anomalous states. The baseline vs. anomalous classification is at the level of individual code blocks as well as for the overall device.

Figure 3:
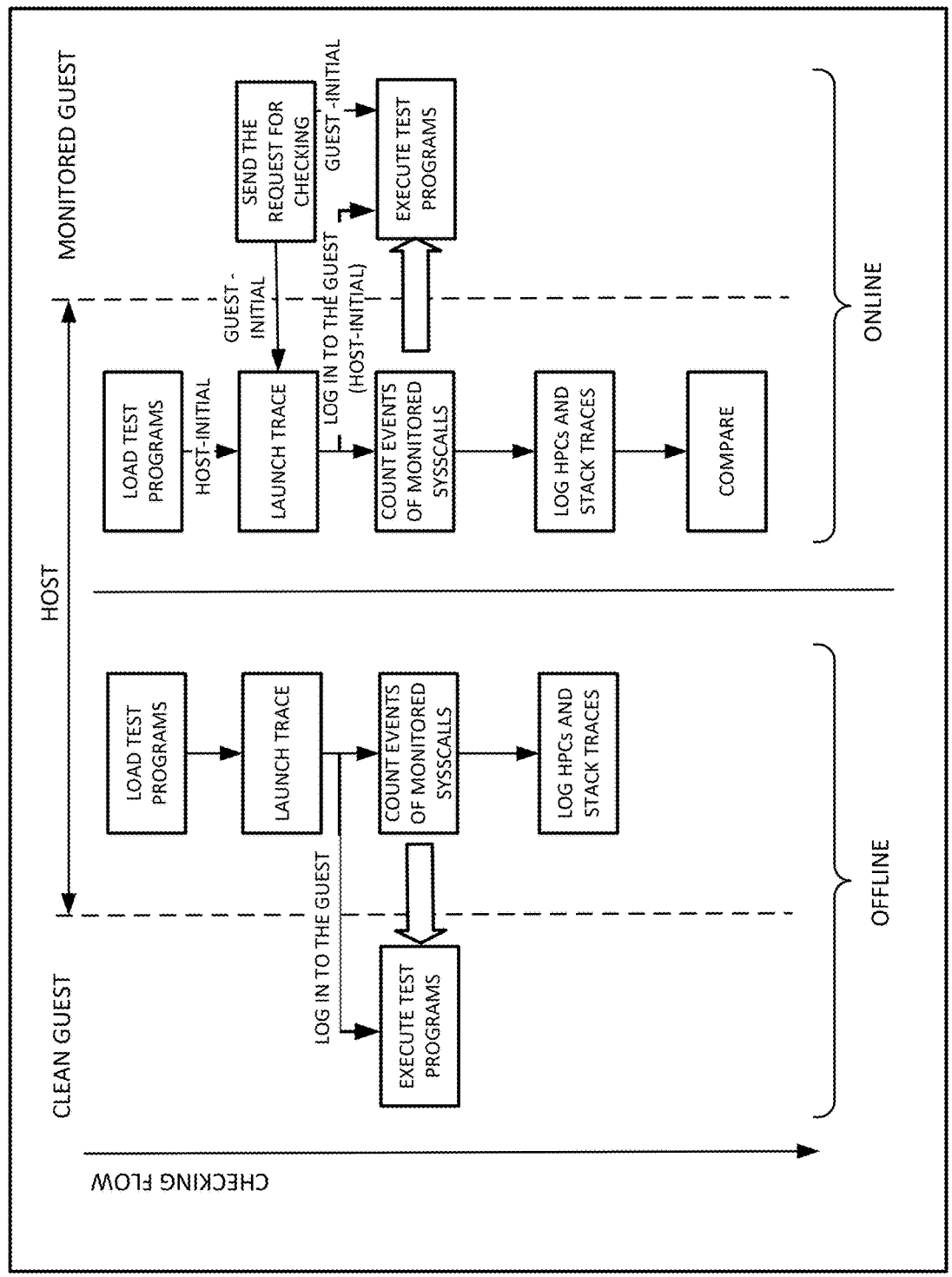
FIG. 3 illustrates an example of training-time machine learning and run-time anomaly detection.

The training-time machine learning and the run-time anomaly detection are illustrated in FIG. 3.

§ 4.3 Example Method(s)

§ 4.3.1 Overview

FIG. 16 is a flow diagram of an example method 1600, consistent with the present invention, for determining an aspect of behavior of an embedded device and/or an embedded system. As shown, the example method 1600 determines a baseline behavior from a sequence of patterns in real-time digital measurements (e.g., from HIPCs and/or stack traces) extracted from the embedded system. (Block 1610) The example method 1600 then extracts, while the embedded system is operating, real-time digital measurements (e.g., from HPCs and/or stack traces) from the embedded system. (Block 1620) Then, the example method 1600 extracts features from the real-time digital measurements (that were extracted from the embedded system while the embedded system was operating). (Block 1630) Finally, the example method 1600 determines the aspect of the behavior of the embedded system by analyzing the extracted features with respect to (expected) features of the baseline behavior. (Block 1640)

Figure 4:
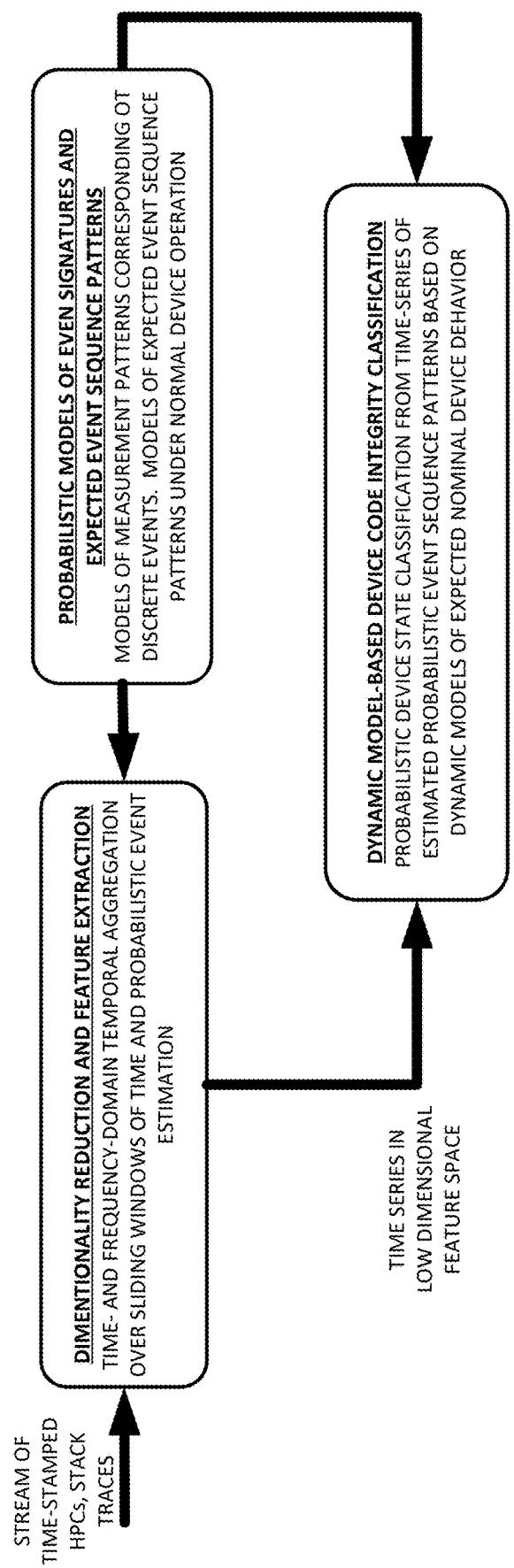
FIG. 4 illustrates an example algorithmic architecture of a TRACE embodiment.

The algorithmic architecture of TRACE is illustrated in FIG. 4. TRACE uses a set of feature extraction algorithms to compute low-dimensional representations from time series of measurements. A machine learning approach is used to learn the probability distributions of the extracted features in the baseline operation. An event sequence approach is used to account for variations of the device operating mode or some high-level code state during normal operation of the device through a composite probability distribution model, wherein machine learning based classifiers are trained for the different operating modes or code states. Let us denote the time series of measurements (considering HPC and stack trace measurements using the same notation for convenience) over a time interval (or over multiple code block executions) as $\{m_1, \ldots, m_n\}$. TRACE uses these measurements to determine the likelihood of whether the device is operating normally or is anomalous in some way and to determine which code block(s) could be exhibiting anomalous behavior.

§ 4.3.2 Time Windowing and Low-Dimension Feature Extraction

The HPC and stack trace measurements over sliding windows of time are used to form time domain and frequency-domain feature characteristics using transform techniques and kernel methods. While TRACE measures HPCs as numerical values (e.g., numbers of instructions and branches over a time interval), one can represent the stack traces using discrete labels. The most frequently appearing stack traces for a code block are labeled as labels 1, . . . , N. The less often occurring stack traces are categorized using a catch-all label N+1 (This is analogous to the "background" tag in semantic segmentation in image processing applications).

For time-domain signal aggregation over sliding time windows (in general, of different lengths and with overlaps of successive windows), features are extracted using multiple techniques [25-31] including basic statistics (such as max, min, mean, root mean square, and statistics of inter-sample changes), histograms, autocorrelations (e.g., lags for autocorrelation peaks), and kernel methods such as the kernel principal component analysis. Combinations of low-dimensional feature extractors provide semantic hashes comprising of low-dimensional feature representations of the measurements over time windows.

TRACE extracts the frequency-domain features using Fourier and wavelet transform techniques according to the empirically observed signal characteristics. These features include frequencies (in sorted order) of a few of the highest peaks in the Fourier transform. The time-domain and frequency-domain dimensionality reduction methods provide an information quantization framework to encapsulate time windows of HPC and stack trace measurements in low-dimensional feature vectors.

Using the feature extraction techniques, TRACE maps the measurement set $\{m_1, \ldots, m_n\}$ into a time-series of feature vectors $\{f_1, \ldots, f_r\}$. For example, a time series of HPC measurements collected from an embedded PLC is shown in FIG. 5. The Wago PLC has an ARM Cortex A8 processor running a custom real-time Linux distribution. The control logic for the PLC is specified using a Structured Text program (IEC 61131-3 standard), which runs on the PLC as a highly multi-threaded process (e.g., 23 threads I/O, controls, etc.,). A sample of HPC measurements collected for this multi-threaded process are also shown in FIG. 5.

From the time series of measurements, various types of low-dimensional features are extracted by TRACE over sliding time windows as described above. Examples of TRACE feature extraction are shown in FIG. 6. Using these extracted features, TRACE uses algorithms based on machine learning approaches such as one-class Support Vector Machine (SVM) and Recurrent Neural Network (RNN) based probability distribution modeling to anomalies as deviations from the baseline.

An example of combined HPC and stack trace profiling by TRACE of a multi-threaded real-time controller process is shown in FIG. 7. Samples of the types of time-correlated information that can be obtained by HPC and stack trace measurements are also given in FIG. 7. The code executing on the embedded device is characterized not only by the feature vector values extracted from the time series of HPC and stack trace measurements, but also crucially by the temporal order and, more generally, by the temporal inter-relations between the feature vectors. From the time series of feature vectors, one can then probabilistically detect events as described below using a machine learning classifier. The classifier is trained using data sets collected during device operation and combining them with auxiliary data on device characteristics and run-time behavior.

§ 4.3.3 Feature-Based Probabilistic Classification

TRACE uses a machine learning approach to model the empirically observed probability distributions of time series of feature vectors over time windows and to detect deviations from expected baseline behavior. For example, from a time series $\{f_1, \ldots, f_j\}$ of feature vectors over a time interval, TRACE machine learning-based classifier determines $P(\zeta|\{f_1, \ldots, f_j\})$ where $\zeta$ denoted different possible hypotheses of the device state. For example, in the simplest case, $\zeta$ could denote the hypotheses of baseline versus anomalous for the device. More generally, $\zeta$ could model the different possibilities of anomalies in the separate code blocks as well as the different operating modes of the device. TRACE uses a Bayesian approach to estimate $P(\zeta|\{f_1, \ldots, f_j\})$ based on the estimation of $P(\{f_1, \ldots, f_j\}|\zeta)$, i.e., the likelihood of observing the feature vector time series $\{f_1, \ldots, f_j\}$ under the different possibilities of hypotheses of the device state $\zeta$. TRACE estimates this conditional probability based on learning the probabilistic characteristics of observations of feature vector time series empirically from the training data.

TRACE learns the baseline characteristics of the feature vector time series using Recurrent Neural Networks (RNN) based on Long Short-Term Memory architectures, multi-layer neural networks, stacked restricted Boltzmann machines, and Support Vector Machines. TRACE formulates the outputs of this machine learning system in terms of parameters of a probability distribution model (e.g., using a mixture density network approach). The system is trained using a loss function defined in terms of the computed likelihoods of observing the observations of sequences of feature vectors. The RNN components of the system are taught using back propagation through time in combination with the other elements in an end-to-end learning framework.

§ 4.3.4 Event Sequences

TRACE uses multiple machine learning classifiers in parallel to address variations in the operating mode of the device. The combination of the machine learning classifiers provides estimates of probabilities of the platform being in the various possible device states in each of a set of possible operating modes based on the observed time series of measurements. The time-series of outputs from the machine learning classifiers form a stochastic event sequence. A dynamic discrete-time/discrete-event model formulation of the expected temporal behavior of the device (e.g., temporal relationships between events, periodic repetitions of event sequences, etc.) is used to monitor the event sequence and estimate anomaly likelihoods. TRACE learns the dynamic model of expected temporal behavior from training data based on known device code/behavioral characteristics.

TRACE uses the estimated stochastic event sequence at run-time to characterize the plausibility of observed event sequences and probabilistically classify between different device states (e.g., parts of the known code, unknown/modified program, changes in temporal event sequence characteristics that do not fit expected device behavior). Both the machine learning classifier and the dynamic, event sequence monitoring algorithms are formulated within a stochastic context to account for non-determinacies, time variations, and uncertainties that occur at run-time. For robust event recognition within the possibly temporally skewed and noisy sensor data, the training data is generated over several executions of the known code with several different characteristics of the peripheral behavior and user inputs, if relevant for a device. Depending on the level of access to the device firmware/software, the separate code blocks could repeatedly be executed in isolation and pro filed separately.

The formalism of discrete-time and discrete-event control systems and estimation theory provides a framework for probabilistic estimation of overall device state based on event sequences. Determination of the global device state from an estimated event sequence is a probabilistic matching problem. This problem can be efficiently addressed using multi-hypotheses and graph-based methods (based on models of event transitions). When analyzing event sequences, both presence and absence of events can inform the probabilistic state classification. For example, a code injection attack that causes a change in the code execution could manifest as an unexpected cache miss. The absence of an expected cache miss could be a symptom of a modification to the code.

In an embedded CPS device, changes in periodic repetitions of input operations, CPU usage for control computations, and output operations could indicate code modifications or changes to parameters at run-time (e.g., change in sampling rate). Also, a feature classifier trained to detect events corresponding to code blocks in the device firmware/software provides information that can be used to reconstruct the control ow and thereby changes in code execution patterns from the expected device behavior. In general, Metric Temporal Logic, an extension of Linear Temporal Logic with the addition of timing information/constraints, can be used to de fine the set of expected device behaviors in a general and flexible framework [32-35]. Also, a discrete-time and discrete event dynamic model of the system can be used to specify sequences of events and can be combined with a discrete-time/discrete-event observer and stochastic filtering techniques [36, 37] to estimate the divergence from the nominal model and estimate probability of modification to the code.

§ 4.4 Extensions, Refinements and Alternatives

The methods and apparatus described above are extensible to other side channels as well, to robustly detect malware, rootkits, changes to applications at run-time (e.g., code injection/-modification, software parameter changes due to run-time recon figuration commands), execution of unauthorized code, and other attacks and offers provable guarantees.

Besides HPCs, TRACE may use snapshots of code execution state captured through stack traces. While HPCs provide a measure of the rates/types of processor activity (e.g., numbers of instructions, branches, etc.), stack traces provide instantaneous snapshots of the execution state of a program. HPCs and stack traces are measured on a thread level. The combination of HPCs and stack traces improve the fidelity of malware detection (i.e., less false positives and false negatives). When applied to a target device, TRACE may be initially deployed to baseline the device in its clean state. Once the baseline has been established for a device (or, more generally, for a device type), TRACE may then be used to check the integrity of fielded devices. TRACE actively interrogates the digital side channels in run-time and analyzes the measurements using machine learning algorithms to flag anomalous code execution and to build signatures of such anomalous modifications.

In combination with HPCs and/or stack traces, TRACE may also use other measurements such as from the operating system kernel to detect kernel-level anomalies such as rootkits. For this purpose, kernel-level monitoring mechanisms may include memory addresses in the system call table, memory contents at the system call address locations, dynamically loaded kernel modules, and kernel data structures related to task scheduling. The kernel-level monitoring component may be implemented using kernel memory interfaces accessible from user space or using an in-kernel component, which communicates information to the user-space measurer using kernel logging functionalities.

To correlate the HPC and/or stack trace measurements to the statically/dynamically loaded components (binary modules) of a process, TRACE may use mapping of memory areas corresponding to statically and dynamically loaded binary modules and cross-referencing of elements of collected measurements to the corresponding modules using the addresses in the stack traces and temporal correlation with the HPC measurements. In addition, binary decompilation and analysis of the statically and dynamically loaded binary modules may be used to cross-reference run-time measurements to locations in the binary modules.

§ 4.5 Conclusions

The example HPC-based framework of § 4.2.2.1 provides a flexible and general-purpose framework for real-time monitoring of processes on embedded CPS devices. The proposed approach is based on machine learning based classification of time series of HPC measurements using low-dimensional feature vector characterizations. The algorithmic approach developed is applicable to multithreaded processes that are typical in real-time control implementations in embedded CPS devices such as PLCs. The efficacy of the approach was demonstrated on a Wago PLC in a HITL testbed of an industrial control system benchmark.

The proposed approach for real-time monitoring has also been implemented on a few other target devices (including 32-bit and 64-bit Intel and ARM devices) and it has been noted that the proposed techniques are scalable to a wide range of devices and can be used for monitoring of specific target processes on the devices and also for simultaneous monitoring of all processes on the device.

What is claimed is:
1. A computer-implemented method for determining an aspect of behavior of an embedded system, the computer-implemented method comprising:
   a) determining a baseline behavior of the embedded system from a sequence of patterns in real-time digital measurements extracted from each of at least two of multiple process threads of the embedded system;
   b) extracting, while the embedded system is operating, real-time digital measurements from each of the at least two of multiple process threads of the embedded system;
   c) extracting features from the real-time digital measurements extracted from each of the at least two of multiple process threads of the embedded system while the embedded system was operating; and
   d) determining the aspect of the behavior of the embedded system by analyzing temporal relationships between the extracted features of different ones of the multiple process threads with respect to temporal relationships between features extracted from the real-time digital measurements, extracted from different ones of the multiple process threads, from which the baseline behavior was determined.

2. The computer-implemented method of claim 1 wherein the aspect of behavior determined is whether the embedded system is functioning as desired.

3. The computer-implemented method of claim 1 wherein the aspect of behavior determined is whether code in the embedded system has been subject to an unauthorized modification.

4. The computer-implemented method of claim 1 wherein the embedded system consists of at least one embedded device.

5. The computer-implemented method of claim 1 wherein the embedded system includes at least one embedded device and at least one peripheral device.

6. The computer-implemented method of claim 5 wherein the at least one peripheral device is selected from a group of devices consisting of (a) sensors, (b) actuators, (c) displays, and (d) storage devices.

7. The computer-implemented method of claim 1 wherein determining the aspect of the behavior of the embedded system uses at least one of a trained machine learning classifier and statistical analysis.

8. The computer-implemented method of claim 1 wherein the embedded system includes at least one of a general purpose computer, an embedded microprocessor, or a specialized machine running code.

9. The computer-implemented method of claim 1 wherein the real-time digital measurements are extracted from each of the at least two of multiple process threads of the embedded system via at least one hardware performance counter on the embedded system.

10. The computer-implemented method of claim 1 wherein the real-time digital measurements are extracted from each of the at least two of multiple process threads of the embedded system via at least one stack trace on the embedded system.

11. Apparatus for determining an aspect of behavior of an embedded system, the apparatus comprising:
  a) a baseline determination module configured to determine a baseline behavior of the embedded system from a sequence of patterns in real-time digital measurements extracted from each of at least two of multiple process threads of the embedded system;
  b) a measurement module configured to extract, while the embedded system is operating, real-time digital measurements from each of the at least two of multiple process threads of the embedded system;
  c) a feature extraction module for extracting features from the real-time digital measurements extracted from each of the at least two of multiple process threads of the embedded system while the embedded system was operating; and
  d) an analyzer adapted to determine the aspect of the behavior of the embedded system by analyzing temporal relationships between the extracted features of different ones of the multiple process threads with respect to temporal relationships between features extracted from the real-time digital measurements, extracted from different ones of the multiple process threads, from which the baseline behavior was determined.

12. The apparatus of claim 11 wherein the aspect of behavior determined is whether the embedded system is functioning as desired.

13. The apparatus of claim 11 wherein the aspect of behavior determined is whether code in the embedded system has been subject to an unauthorized modification.

14. The apparatus of claim 11 wherein the embedded system consists of at least one embedded device.

15. The apparatus of claim 11 wherein the embedded system includes at least one embedded device and at least one peripheral device, and wherein the at least one peripheral device is selected from a group of devices consisting of (a) sensors, (b) actuators, (c) displays, and (d) storage devices.

16. The apparatus of claim 11 wherein the analyzer is least one of a trained machine learning classifier and a statistical analyzer.

17. The apparatus of claim 11 wherein the embedded system includes at least one of a general purpose computer, an embedded microprocessor, or a specialized machine running code.

18. The apparatus of claim 11 wherein the baseline determination module and the measurement module each extract real-time digital measurements from each of the at least two of multiple process threads of the embedded system via at least one hardware performance counter on the embedded system.

19. The apparatus of claim 11 wherein the baseline determination module and the measurement module each extract real-time digital measurements from each of the at least two of multiple process threads of the embedded system via at least one stack trace on the embedded system.

20. A non-transitory computer-readable storage medium storing processor executable code which, when executed by at least one processor, cause the at least one processor to perform a method for determining an aspect of behavior of an embedded system, the method comprising:
  a) determining a baseline behavior of the embedded system from a sequence of patterns in real-time digital measurements extracted from each of at least two of multiple process threads of the embedded system;
  b) extracting, while the embedded system is operating, real-time digital measurements from each of the at least two of multiple process threads of the embedded system;
  c) extracting features from the real-time digital measurements extracted from each of the at least two of multiple process threads of the embedded system while the embedded system was operating; and
  d) determining the aspect of the behavior of the embedded system by analyzing temporal relationships between the extracted features of different ones of the multiple process threads with respect to temporal relationships between features extracted from the real-time digital measurements, extracted from different ones of the multiple process threads, from which the baseline behavior was determined.

* * * * *